(12) United States Patent
Okada

(10) Patent No.: US 7,102,990 B2
(45) Date of Patent: Sep. 5, 2006

(54) OPTICAL INFORMATION-RECORDING MEDIUM AND OPTICAL INFORMATION RECORDING/REPRODUCING METHOD

(75) Inventor: Mitsuya Okada, Tokyo (JP)

(73) Assignee: NEC Corporation, Tokyo (JP)

( * ) Notice: Subject to any disclaimer, the term of this patent is extended or adjusted under 35 U.S.C. 154(b) by 901 days.

(21) Appl. No.: 10/112,752

(22) Filed: Apr. 2, 2002

(65) Prior Publication Data

US 2002/0141315 A1    Oct. 3, 2002

(30) Foreign Application Priority Data

Apr. 3, 2001    (JP) ............................ 2001-104325

(51) Int. Cl.
*G11B 7/24*    (2006.01)
(52) U.S. Cl. ................ 369/275.4; 369/13.35; 369/275.2
(58) Field of Classification Search ............. 369/285, 369/275.5, 53.34, 282–286, 288, 275.4, 44.26, 369/94, 13.35, 13.4, 275.1, 275.2
See application file for complete search history.

(56) References Cited

U.S. PATENT DOCUMENTS

| | | | | |
|---|---|---|---|---|
| 4,451,914 A | * | 5/1984 | LaBudde et al. | 369/121 |
| 5,449,589 A | * | 9/1995 | Yamada et al. | 430/270.13 |
| 5,577,021 A | * | 11/1996 | Nakatani et al. | 369/275.2 |
| 5,631,895 A | * | 5/1997 | Okada et al. | 369/275.1 |
| 5,677,903 A | * | 10/1997 | Holtslag et al. | 369/112.28 |
| 5,748,607 A | * | 5/1998 | Ohira et al. | 369/275.4 |
| 6,115,353 A | * | 9/2000 | Horie et al. | 369/275.4 |
| 6,187,406 B1 | * | 2/2001 | Ichihara et al. | 428/64.1 |
| 6,692,809 B1 | * | 2/2004 | Matsukawa et al. | 428/64.1 |
| 2002/0048242 A1 | * | 4/2002 | Yamamoto | 369/47.51 |

OTHER PUBLICATIONS

K. Kayanuma et al., "High Track Density Magneto-Optical Recording Using a Crosstalk Canceler", SPIE vol. 1316, Optical Data Storage, 1990, pp. 35-39.

* cited by examiner

*Primary Examiner*—Thang V. Tran
*Assistant Examiner*—Parul Gupta
(74) *Attorney, Agent, or Firm*—McGinn IP Law Group, PLLC

(57) ABSTRACT

An optical information-recording medium comprises (a) a disk-shaped substrate having a first main surface and a second main surface opposite to the first main surface; an incidence surface of the medium being located to be nearer to the first main surface than the second main surface; (b) a recording layer formed on the substrate; and (c) a signal generation layer formed on the substrate in such a way as to be nearer to the incident surface than the recording layer. The signal generation layer allows an incident light beam irradiated to the incidence surface to pass through and allows a reflected light beam from the recording layer to pass through. The signal generation layer includes a transmittance changing region having a transmittance with respect to the incident light beam different from its neighborhood, thereby generating a repeated transmittance change according to rotation of the medium.

8 Claims, 14 Drawing Sheets

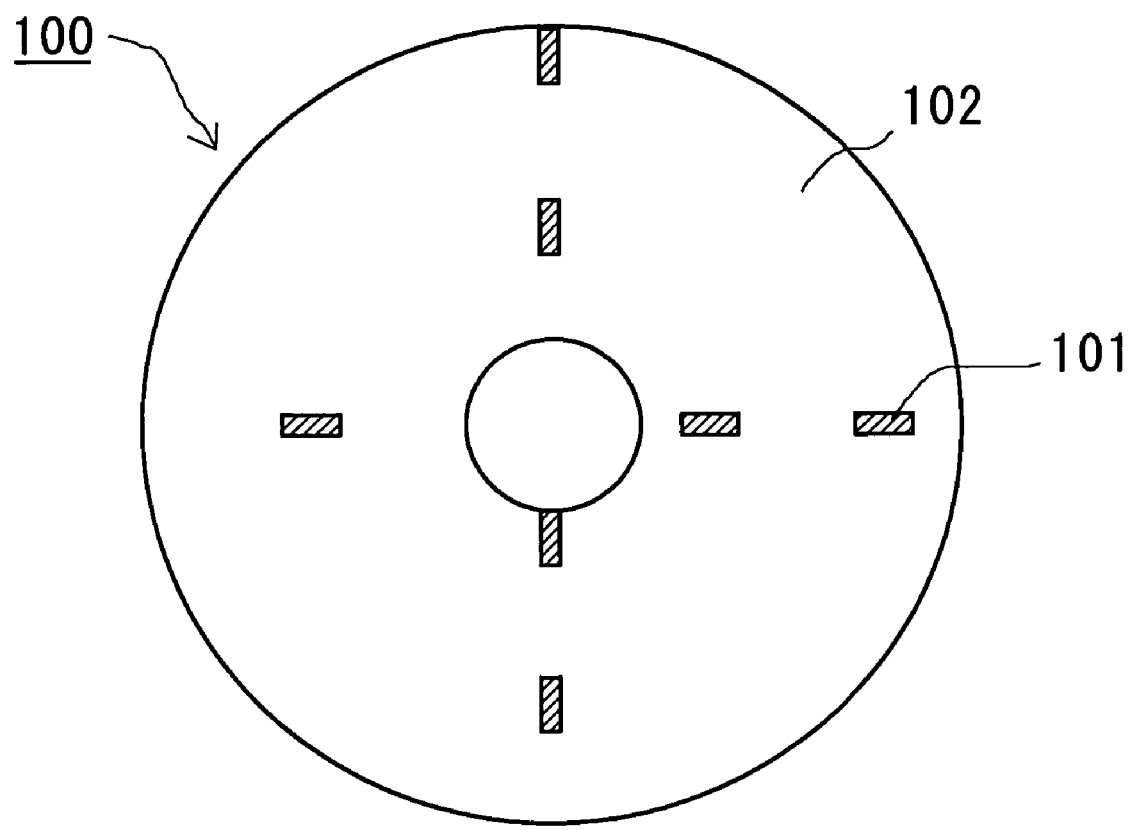

OPTICAL INFORMATION-RECORDING MEDIUM AND OPTICAL INFORMATION RECORDING/REPRODUCING METHOD

BACKGROUND OF THE INVENTION

1. Field of the Invention

The present invention relates to optical information recording. More particularly, the invention relates to an optical information-recording medium (e.g., an optical disk) capable of recording, reproduction, and erasing of information by irradiating a light beam, and an optical information recording/reproducing method using the medium.

2. Description of the Related Art

Optical disk recording with laser light is capable of not only recording a large amount of information but also noncontact, high-speed access and therefore, it has been practically applied to mass-storage memory devices and systems.

Optical disks are divided into some types; "Read-Only" type known as the compact disk and laser disk, the "Write-Once" type writable by the user only once, and "Rewritable" type rewritable by the user repetitively. The "Write-Once" and "Rewritable" types are used for external memory devices of computers or memory systems for recording document and/or image files.

With conventional optical disks, the reproduction signal is detected or generated from a laser beam reflected and modulated by the optical disk. For example, with the Read-Only" type optical disk, the change of amount of the reflected laser beam, which is generated by the pits on the disk, is used to derive the reproduction signal. With the "Write-Once" type optical disk, pit formation or local phase change on the disk, which is caused by irradiation of a writing laser beam, is utilized for the same purpose.

With the magneto-optical (MO) disk, which is one type of the "Rewritable" disks, the state of magnetization of the recording layer is derived from the change of polarization plane using the magneto-optical effect of the recording layer, forming the reproduction signal. With the phase-change type optical disk, which is another type of the "Rewritable" disks, phase change in the small areas of the disk caused by irradiation of a laser beam is utilized for the same purpose. This is the same as the "Write-Once" type optical disk.

Conventional optical disks comprise spiral grooves formed as the tracking guide on a transparent resin or glass substrate at a pitch of 0.74 µm to 1.6 µm. A laser beam, which is irradiated to the disk to record or reproduce the information, is focused and relatively moved along the grooves. Typically, each track in a cycle is divided into several tens of sectors and then, "preformatting pits" are formed or marked at the head of each sector in advance to record the track address, the sector address, and the synchronization signal. As the recording tracks, the grooves or the lands existing between the adjoining grooves are used. If the grooves are used for recording, it is termed the "in-groove recording", in which the preformatting pits are formed in the grooves. If the lands are used for recording, it is termed the "on-land recording", in which the preformatting pits are formed on the lands.

To increase the recording density of optical disks, it is effective to record the information both in the grooves and on the lands, which is termed the "land & groove recording". This was reported by K. kayanuma et al., in the paper SPIE Proceedings, Vol. 1316, Optical Data Storage, 1990, pp. 35–39, entitled "High Track Density Magneto-Optical Recording Using a Crosstalk Canceler". The recent "DVD-RAM" type optical disks have employed the "land & groove recording".

As explained above, each of the circular tracks is divided into sectors, in which the track address, the sector address, and the synchronization signal are recorded by the preformatting pits. The preformatting data occupy approximately 20% of the maximum recordable amount of the disk and thus, it may be said that the preformatting data limits the available capacity of the disk. According to rough calculation of the so-called "preformatting efficiency", it is approximately 80% for the DVD-RAMs. Since the VFO signal and the SYNC signal for synchronization in the recording or reproduction operation occupy 60% to 70% of the preformatting data, the preformatting efficiency can be improved if the synchronization signal can be derived from some data other than the preformatting data.

As one of the techniques to raise the preformatting efficiency, the "groove wobbling" method has been developed and used practically, in which the grooves are wobbled at a specific low frequency (i.e., the wobbling frequency) to record the track address information and the synchronization signal. This method has already been applied to the CD-R, CD-RW, and DVD-RW types of optical disks. For example, the CD-R type includes the wobbled grooves with the basic wobbling frequency of 22.05 kHz. The DVD-R type includes the wobbled grooves with the wobbling frequency of 140 kHz.

The "groove wobbling" method has ever been applied to only the in-groove recording, because both of the grooves and lands are difficult to be wobbled at different timing. Moreover, this method has a disadvantage that the wobbled grooves need to be formed by wobbling an optical exposure beam at high accuracy in the mastering process to produce the master disk. This method has another disadvantage that the wobbling signal itself is likely to be affected by the recording marks and thus, the wobbling signal is difficult to be detected correctly.

SUMMARY OF THE INVENTION

Accordingly, an object of the present invention is to provide an optical information-recording medium that includes a new means for deriving the synchronization signal instead of the wobbling signal and the VFO signal, and an optical information recording/reproducing method using the medium.

Another object of the present invention is to provide an optical information-recording medium that raises the formatting efficiency with a simple structure, and an optical information recording/reproducing method using the medium.

Still another object of the present invention is to provide an optical information-recording medium that increases the available or recordable amount of information easily, and an optical information recording/reproducing method using the medium.

The above objects together with others not specifically mentioned will become clear to those skilled in the art from the following description.

According to the first aspect of the invention, an optical information-recording medium is provided, which comprises (a) a disk-shaped substrate having a first main surface and an a second main surface opposite to the first main surface;

an incidence surface of the medium being located to be nearer to the first main surface than the second main surface;

(b) a recording layer formed on the substrate; and (c) a signal generation layer formed on the substrate in such a way as to be nearer to the incident surface than the recording layer;

the signal generation layer allowing an incident light beam irradiated to the incidence surface to pass through and allowing a reflected light beam from the recording layer to pass through;

the signal generation layer including a transmittance changing region;

the transmittance changing region having a transmittance with respect to the incident light beam different from its neighborhood, thereby generating a repeated transmittance change according to rotation of the medium.

With the optical information-recording medium according to the first aspect of the invention, the signal generation layer is formed on the substrate in such a way as to be nearer to the incidence surface than the recording layer. The signal generation layer allows the incident light beam irradiated to the incidence surface to pass through and allows the reflected light beam from the recording layer to pass through. Therefore, the incident light beam passes through the signal generation layer.

The signal generation layer includes the transmittance changing region having a transmittance with respect to the incident light beam different from its neighborhood, thereby generating a repeated transmittance change according to rotation of the medium. Therefore, the reflected light beam is modulated by the signal generation layer if the medium is rotated. By deriving the change of amount of the reflected light beam from the reflected light beam thus modulated, a synchronization signal can be generated with a Phase-Locked Loop (PLL) circuit.

Accordingly, the signal generation layer including the transmittance change region constitutes a new means for deriving the synchronization signal without using the wobbling signal and the VFO signal.

Furthermore, since the wobbling signal and the VFO signal are unnecessary, the quantity of the preformatting data is decreased. Thus, the formatting efficiency can be raised with a simple structure, which increases the available or recordable amount of information easily.

Additionally, the previously-identified disadvantages of the "groove wobbling" method that the wobbled grooves need to be formed by wobbling an optical exposure beam at high accuracy in the mastering process and that the wobbling signal itself is likely to be affected by the recording marks can be avoided. This is because the wobbled grooves are not required.

In a preferred embodiment of the medium according to the first aspect of the invention, the transmittance changing region of the signal generation layer is formed to extend radially from a center of the substrate.

In another preferred embodiment of the medium according to the first aspect of the invention, the signal generation layer comprises a plurality of the transmittance changing regions. The incidence surface is divided into parts by radial lines and concentric circles. The transmittance changing regions are arranged in such a way that radially or circumferentially adjoining ones of the regions are different in transmittance from each other.

In still another preferred embodiment of the medium according to the first aspect of the invention, the signal generation layer comprises a plurality of the transmittance changing regions. The transmittance changing regions are arranged in such a way that at least one of the transmittance changing regions is located in each track of the medium.

In a further preferred embodiment of the medium according to the first aspect of the invention, the signal generation layer comprises a plurality of the transmittance changing regions. The transmittance changing regions are arranged intermittently in radial directions.

In a still further preferred embodiment of the medium according to the first aspect of the invention, the signal generation layer comprises a plurality of the transmittance changing regions. The transmittance changing regions are arranged intermittently at a fixed angular period in radial directions. Each of the transmittance changing regions has a transmittance that varies continuously in a circumferential direction.

According to the second aspect of the invention, another optical information-recording medium is provided, which comprises;

(a) a disk-shaped substrate having a first main surface and a second main surface opposite to the first main surface; an incidence surface of the medium being located nearer to the first main surface than the second main surface;

(b) a recording layer formed on the substrate; and (c) a signal generation layer formed on the substrate in such a way as to be nearer to the incidence surface than the recording layer;

the signal generation layer allowing an incident light beam irradiated to the incidence surface to pass through and allowing a reflected light beam from the recording layer to pass through;

the signal generation layer including a step formation region that forms a depression or protrusion with respect to its neighborhood;

the step formation region having a thickness different from its neighborhood, thereby generating a repeated change of focusing level of the incident light beam according to rotation of the medium.

With the optical information-recording medium according to the second aspect of the invention, the signal generation layer is formed on the substrate in such a way as to be nearer to the incidence surface than the recording layer. The signal generation layer allows the incident light beam irradiated to the incidence surface to pass through and allows the reflected light beam from the recording layer to pass through. Therefore, the incident light beam passes through the signal generation layer.

The signal generation layer includes the step formation region that forms a depression or protrusion with respect to its neighborhood. The step formation region has a thickness different from its neighborhood, thereby generating a repeated change of focusing level of the incident light beam according to rotation of the medium. Therefore, the focusing level or state of the incident light beam is fluctuated by the signal generation layer if the medium is rotated. By detecting an offset of the focusing level caused by the step formation region from the focusing error signal, a synchronization signal can be generated with a PLL circuit.

Accordingly, the signal generation layer including the step formation region constitutes a new means for deriving the synchronization signal without using the wobbling signal and the VFO signal.

Furthermore, since the wobbling signal and the VFO signal are unnecessary, the quantity of the preformatting data is decreased. Thus, the formatting efficiency can be raised with a simple structure, which increases the available or recordable amount of information easily.

Additionally, the previously-identified disadvantages of the "groove wobbling" method that the wobbled grooves need to be formed by wobbling an optical exposure beam at high accuracy in the mastering process and that the wobbling signal itself is likely to be affected by the recording marks can be avoided. This is because the wobbled grooves are not required.

In a preferred embodiment of the medium according to the second aspect of the invention, the step formation region is formed to extend radially from a center of the substrate.

In another preferred embodiment of the medium according to the second aspect of the invention, the step formation layer comprises a plurality of the step formation regions.

The incident surface is divided into parts by radial lines and concentric circles. The step formation regions are arranged in such a way that the radially or circumferentially adjoining ones of the regions are different in thicknesses from each other.

In still another preferred embodiment of the medium according to the second aspect of the invention, the step formation layer comprises a plurality of the step formation regions. The step formation regions are arranged in such a way that at least one of the step formation regions is located in each track of the medium.

In a further preferred embodiment of the medium according to the second aspect of the invention, the step formation layer comprises a plurality of the step formation regions. The step formation regions are arranged intermittently in radial directions.

In a still further preferred embodiment of the medium according to the second aspect of the invention, the step formation layer comprises a plurality of the step formation regions. The step formation regions are arranged intermittently at a fixed angular period in radial directions. Each of the step formation regions has a thickness that varies continuously in a circumferential direction.

In the medium according to the first and second aspects of the invention, it is preferred to have the following structure.

(i) A track ID for identifying a track address is formed in each track of the medium. In this case, the address on the medium can be recognized easily in the recording and reproduction operations of the medium.

(ii) When the medium is of the magneto-optical recording type, the recording layer has a multilayer structure comprising a lower protection sublayer, a magneto-optical recording sublayer, an upper protection sublayer, and a metal reflection sublayer. The recording layer is formed on the first main surface of the substrate while the signal generation layer is formed on the second main surface of the substrate.

(iii) When the medium is of the phase change recording type, the recording layer has a multilayer structure comprising a first dielectric sublayer, a phase-change recording sublayer, a second dielectric sublayer, and a reflection sublayer. The recording layer is formed on the first main surface of the substrate while the signal generation layer is formed on the second main surface of the substrate.

(iv) When the medium is of the phase change recording type, the recording layer has a multilayer structure comprising a first dielectric sublayer, a second dielectric sublayer, a phase-change recording sublayer, a third dielectric sublayer, and a reflection sublayer. The recording layer is formed on the first main surface of the substrate while the signal generation layer is formed on the second main surface of the substrate.

(v) When the medium is of the phase change recording type, the recording layer has a multilayer structure comprising a first dielectric sublayer, a phase-change recording sublayer, a second dielectric sublayer, and a transparent reflection sublayer. The recording layer is formed on the first main surface of the substrate while the signal generation layer is formed on the second main surface of the substrate.

(vi) When the medium is of the magneto-optical recording type, the recording layer has a multilayer structure comprising a metal reflection sublayer, a lower protection sublayer, a magneto-optical recording sublayer, and an upper protection sublayer. The recording layer is formed on the first main surface of the substrate and the signal generation layer is formed over the recording layer.

(vii) When the medium is of the phase change recording type, the recording layer has a multilayer structure comprising a reflection sublayer, a first dielectric sublayer, a phase-change recording sublayer, and a second dielectric sublayer. The recording layer is formed on the first main surface of the substrate and the signal generation layer is formed over the recording layer.

(viii) When the medium is of the phase change recording type, the recording layer has a multilayer structure comprising a reflection sublayer, a first dielectric sublayer, a phase-change recording sublayer, a second dielectric sublayer, and a third dielectric sublayer. The recording layer is formed on the first main surface of the substrate and the signal generation layer is formed over the recording layer.

(ix) When the medium is of the phase change recording type, the recording layer has a multilayer structure comprising a transparent reflection sublayer, a first dielectric sublayer, a phase-change recording sublayer, and a second dielectric sublayer. The recording layer is formed on the first main surface of the substrate and the signal generation layer is formed over the recording layer.

According to the third aspect of the invention, an optical information recording/reproducing method is provided, which uses the medium according to the first aspect of the invention. This method comprises:

(a) irradiating an incident light beam to the medium according to the first aspect of the invention, forming a reflected light beam;

the reflected light beam containing change of amount or quantity caused by the transmittance changing regions of the signal generation layer of the medium in a lower frequency band than that of an information recording signal;

(b) detecting the reflected light beam with an optical detector;

(c) extracting the change of amount or quantity of the reflected light beam in the lower frequency by band separation, thereby generating a synchronization signal for information recording and reproduction.

With the optical information recording/reproducing method according to the third aspect of the invention, obviously, there are the same advantages as those of the medium according to the first aspect of the invention.

According to the fourth aspect of the invention, another optical information recording/reproducing method is provided, which uses the medium according to the second aspect of the invention. This method comprises:

(a) irradiating an incident light beam to the medium according to the second aspect of the invention, forming a reflected light beam;

the reflected light beam containing level change of a focusing error signal caused by the step formation regions of the step formation layer of the medium;

(b) detecting the reflected light beam with an optical detector;

(c) generating a synchronization signal for information recording and reproduction based on the change of the focusing error signal.

With the optical information recording/reproducing method according to the fourth aspect of the invention, obviously, there are the same advantages as those of the medium according to the second aspect of the invention.

BRIEF DESCRIPTION OF THE INVENTION

In order that the present invention may be readily carried into effect, it will now be described with reference to the accompanying drawings.

FIG. 8 is a schematic plan view showing a further example of the arrangement of the slit formation regions of the mediums according to the first and second embodiments of FIGS. 1 and 2 and the arrangement of the step formation regions of the mediums according to the third and fourth embodiments of FIGS. 3 and 4.

Figure 17:
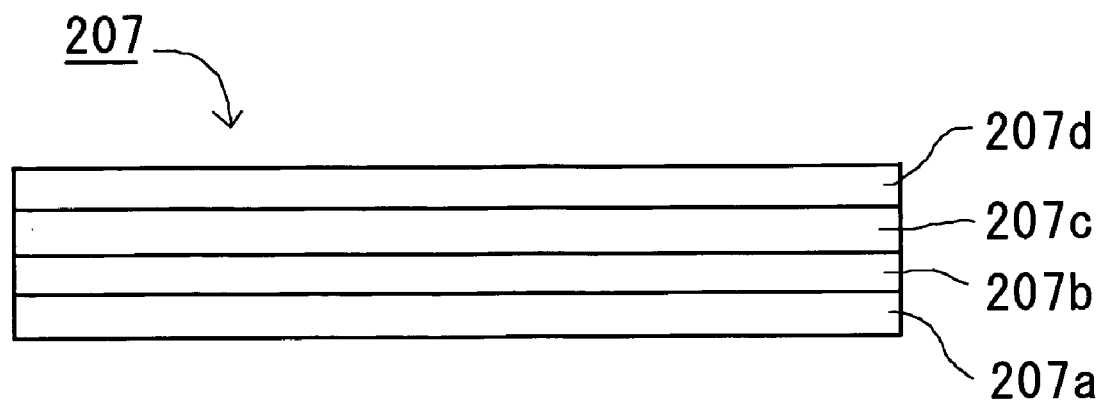

FIG. 17 a schematic cross-sectional view showing the structure of the optical information-recording medium according to Examples 13 and 14 of the invention.

Figure 18:
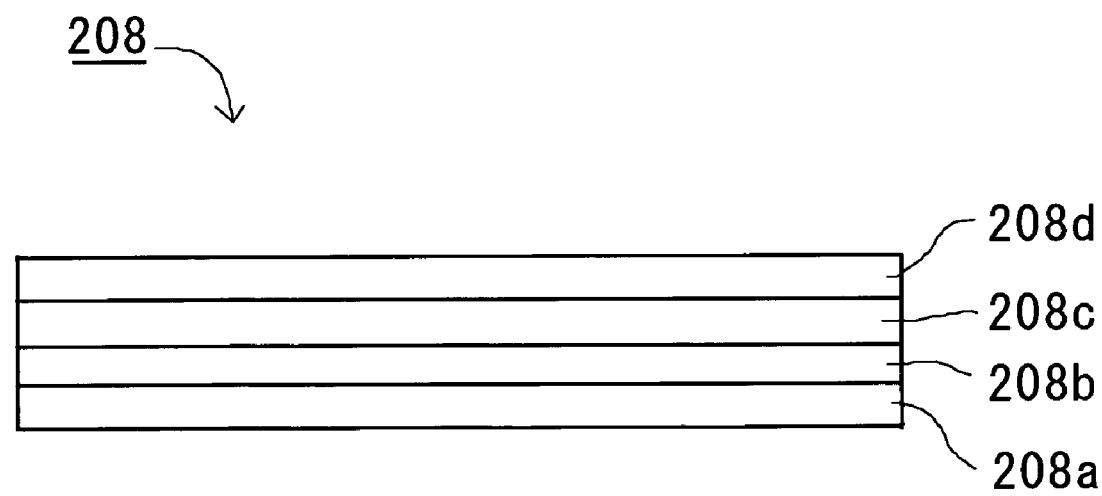

FIG. 18 is a schematic cross-sectional view showing the structure of the optical information-recording medium according to Examples 15 and 16 of the invention.

Figure 19:
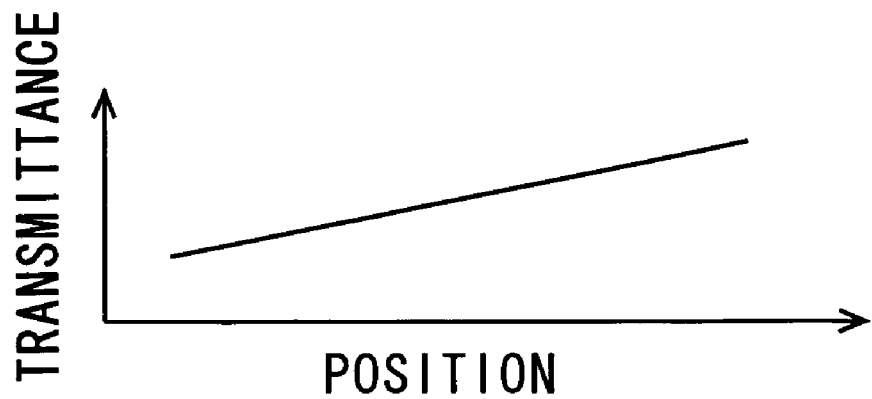

FIG. 19 is a graph showing the change of the transmittance as a function of the position of the slit formation layer of the medium according to the invention.

Figure 20:
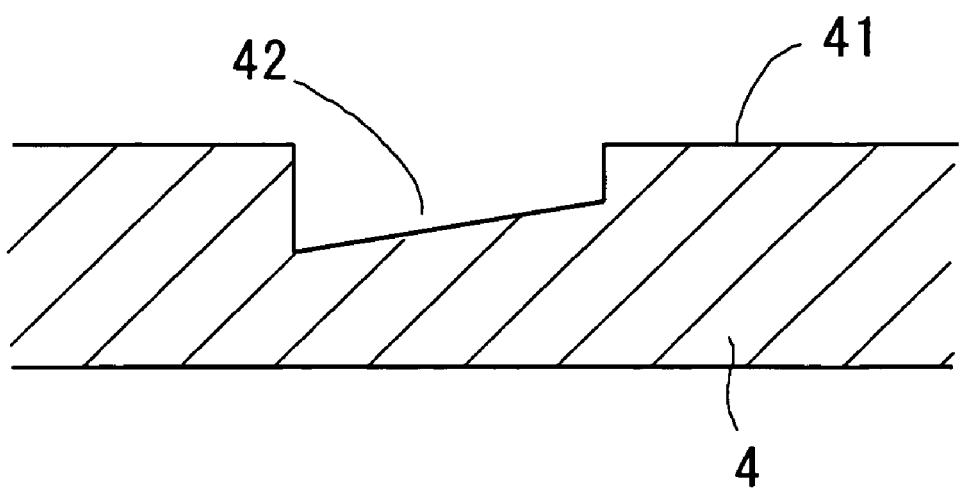

FIG. 20 is a schematic cross-sectional view of the step formation layer of the medium according to the invention.

DETAILED DESCRIPTION OF THE PREFERRED EMBODIMENTS

Preferred embodiments of the present invention will be described in detail below while referring to the drawings attached.

First Embodiment

An optical information-recording medium according to a first embodiment of the invention is explained below with reference to FIG. 1 and FIGS. 5 to 8. This medium is formed as an optical disk.

Figure 1:
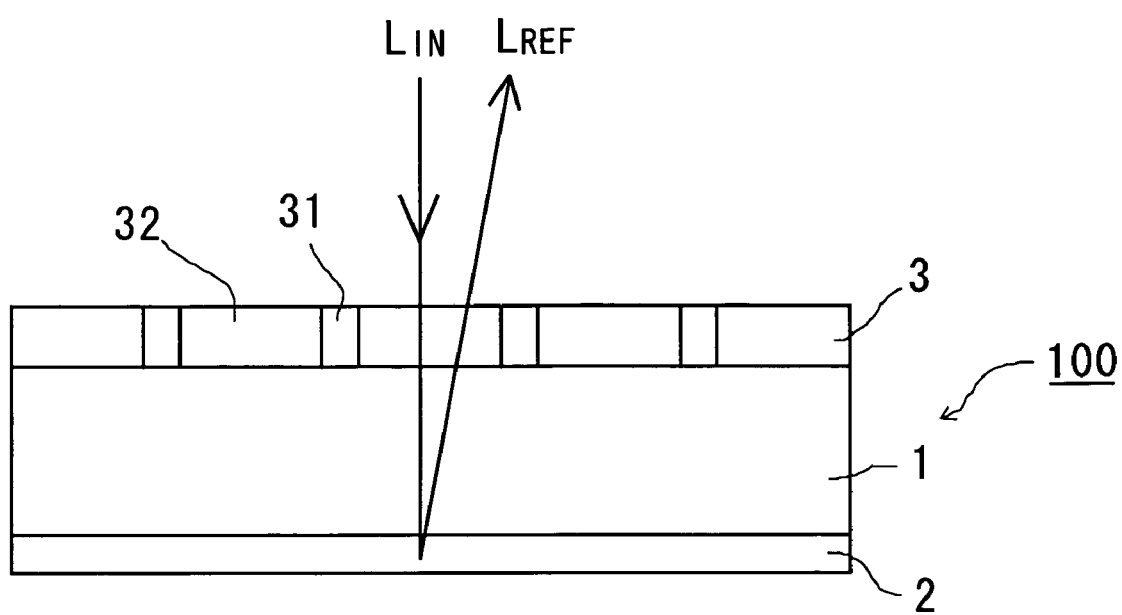
FIG. 1 is a schematic cross-sectional view showing the structure of an optical information-recording medium according to a first embodiment of the invention, which comprises the signal generation formation layer having the slit formation regions.

As shown in FIG. 1, an optical information-recording medium 100 according to the first embodiment comprises a transparent disk-shaped substrate 1, a recording layer 2 formed on the lower main surface of the substrate 1, and a slit layer 3 formed on the upper main surface of the substrate 1. The upper main surface of the medium 100 serves as the incident surface for a laser beam and therefore, it may be said that the slit formation layer 3 is located on the incidence side of the medium 100. In other words, the medium 100 is of the "substrate incidence" type.

The recording layer 2 is used to record or store information. The slit formation layer (i.e., the signal generation layer) 3 is used to form slit regions 31 and the remaining non-slit regions 32 on the incident surface of the medium 100. The slit regions 31 are lower in transmittance for the laser beam than the non-slit regions 32.

Conventionally, the synchronization signal used for the recording and reproduction operation of information has been generated with the use of the VFO signal buried in the preformatting pits in advance on the substrate, or of the wobbling signal extracted from the wobbled grooves on the substrate. Unlike this, with the medium 100 of the first embodiment, the synchronization signal is generated by using the slit regions 31 of the slit formation layer 3.

Specifically, the slit regions 31 of the slit formation layer 3 have limited transmittance for the laser beam with respect to the non-slit regions 32 thereof. Therefore, a reflected light beam $L_{REF}$, which is formed by reflecting an incident light beam $L_{IN}$, is changed by the existence and absence of the regions 31 during the rotation of the medium 100. This means that reflected light beam $L_{REF}$ is modulated according to the arrangement of the regions 31 on the medium 100. The synchronization signal is generated by using the change of quantity of the reflected light beam $L_{REF}$ as a trigger.

In general, the change of quantity of the reflected beam $L_{REF}$ is extracted by a detection system for information recording and reproduction. Since the change of quantity of the reflected beam $L_{REF}$ caused by the slit regions 31 can be set at sufficiently lower frequencies than the information signal to be recorded or and reproduced, the quantity change by the regions 31 can be extracted from the information signal even if both of them utilize the same signal processing system. If the quantity change by the regions 31 can be extracted, a synchronization signal (i.e., a clock signal) with a fixed frequency can be generated using a known PLL circuit.

Since the medium 100 is of the "substrate incidence" type, the incident light beam $L_{IN}$ is irradiated downwardly to the upper main surface of the medium 100 and then, the beam $L_{IN}$ enters the inside of the medium 100. The beam $L_{IN}$ penetrates the slit formation layer 3 and the substrate 1 and thereafter, reflected by the recording layer 2, forming the reflected light beam $L_{REF}$. The reflected beam $L_{REF}$ penetrates the substrate 1 and the slit layer 3 again, and goes out of the medium 100.

The slit formation layer 3 is formed by, for example, a thin film made of synthetic resin such as polycarbonate, or a thin film made of ultraviolet (UV)-setting resin or thermosetting resin, or a thin dielectric film or layer formed by vacuum evaporation or sputtering. The material of the layer 3 needs to have a transmittance difference as desired between the slit regions 31 and the non-slit regions 32 within the wavelength of the laser beam $L_{IN}$ used.

To realize a desired transmittance difference between the slit regions 31 and the non-slit regions 32, for example, an extremely thin metal layer is selectively formed on the surface of the parent or base resin film of the slit formation layer 3, or a proper material (e.g., a pigment or dye) having an optical absorption property with respect to the laser beam $L_{IN}$ may be mixed into the resin film. Alternately, a photosensitive agent is coated on the surface of the slit layer 3 to form a photosensitive layer and then, the slit layer 3 is formed on the substrate 1. Thereafter, the photosensitive layer is selectively exposed using a mask with a desired pattern, thereby realizing a desired transmittance difference. If a mask that has a pattern that changes gradually the transmittance in the circumferential direction is used, then the slit layer 3 has a transmittance that changes continuously in the circumferential direction. In addition, the desired transmittance difference may be formed without using the mask, in which a desired pattern is formed on the layer 5 with a laser beam that exposes the photosensitive layer.

The arrangement of the slit regions 31 and the non-slit regions 32 of the slit formation layer 3 is explained below with reference to FIGS. 5 to 8.

Figure 5:
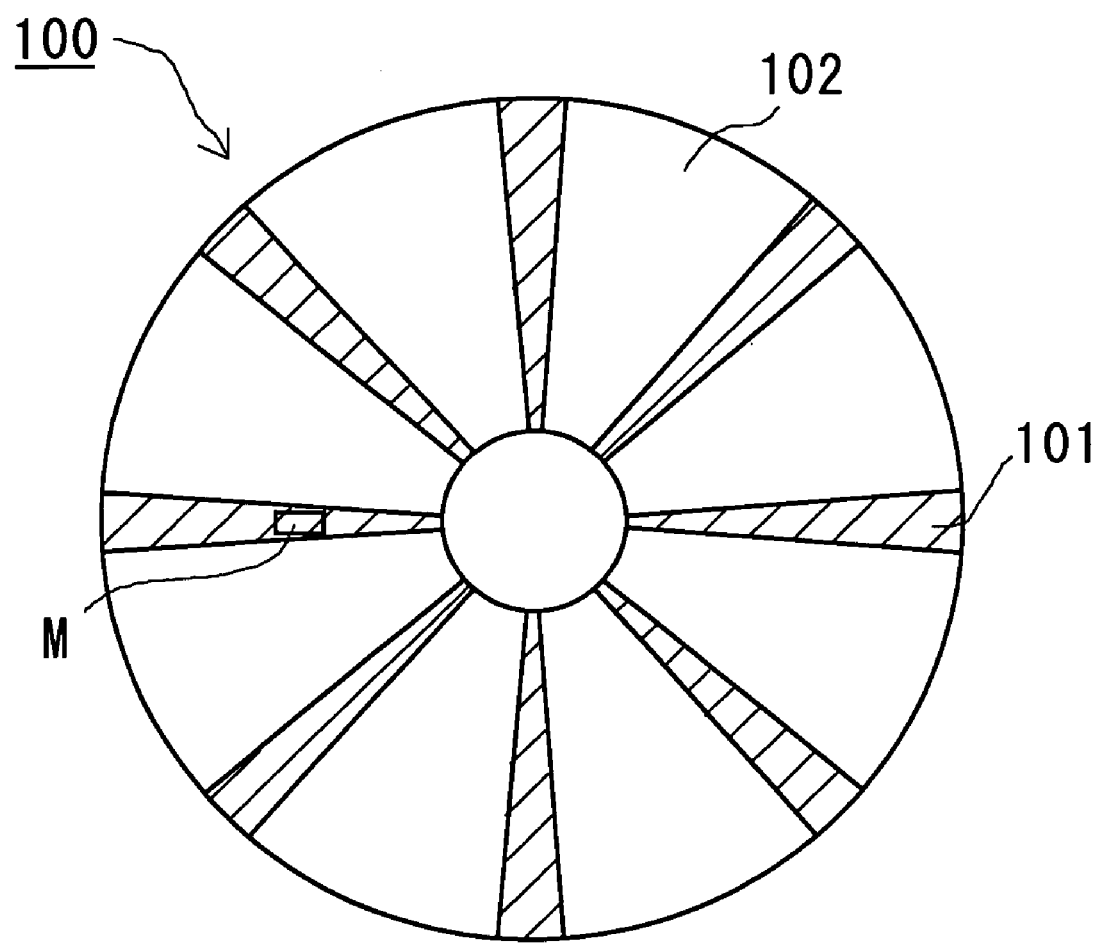
FIG. 5 is a schematic plan view showing an example of the arrangement of the slit formation regions of the mediums according to the first and second embodiments of FIGS. 1 and 2 and the arrangement of the step formation regions of the mediums according to the third and fourth embodiments of FIGS. 3 and 4.

In the arrangement of FIG. 5, the slit regions 31 of the slit formation layer 3 are selectively arranged in the regions 101. In other words, the regions 31 are formed to extend radially from the neighborhood of the center of the medium 100. The regions 101 have a lower transmittance than the regions 102. In this case, the slit regions 31 may be formed in the parts 101 formed intermittently in the radial direction, as shown in FIG. 8.

Figure 6:
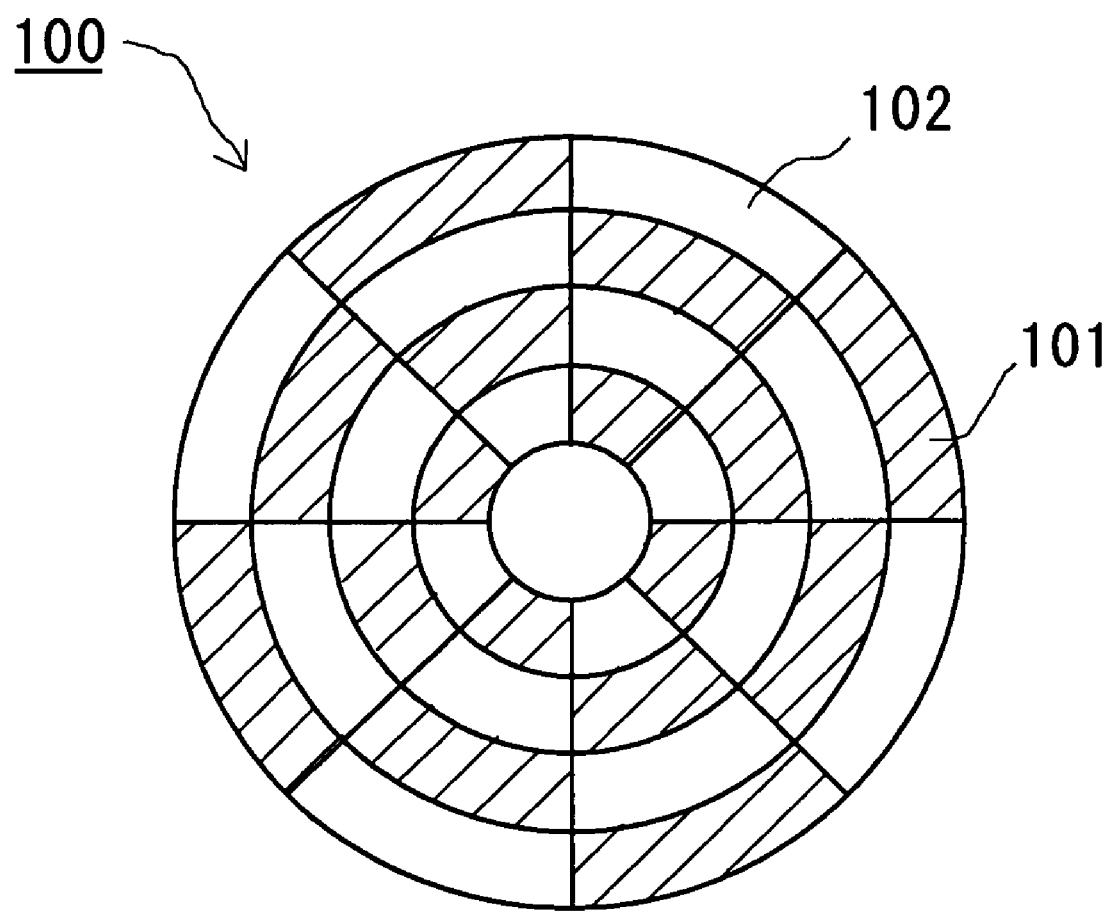
FIG. 6 is a schematic plan view showing another example of the arrangement of the slit formation regions of the mediums according to the first and second embodiments of FIGS. 1 and 2 and the arrangement of the step formation regions of the mediums according to the third and fourth embodiments of FIGS. 3 and 4.

As shown in FIG. 6, if the incident surface of the substrate 1 or the medium 100 itself is divided into parts 101 and 102 by radial lines and concentric circles, the slit regions 31 of the slit formation layer 3 may be arranged in the parts 101 in such a way that the radially or circumferentially adjoining parts 101 and 102 have different transmittance values from each other.

Figure 7:
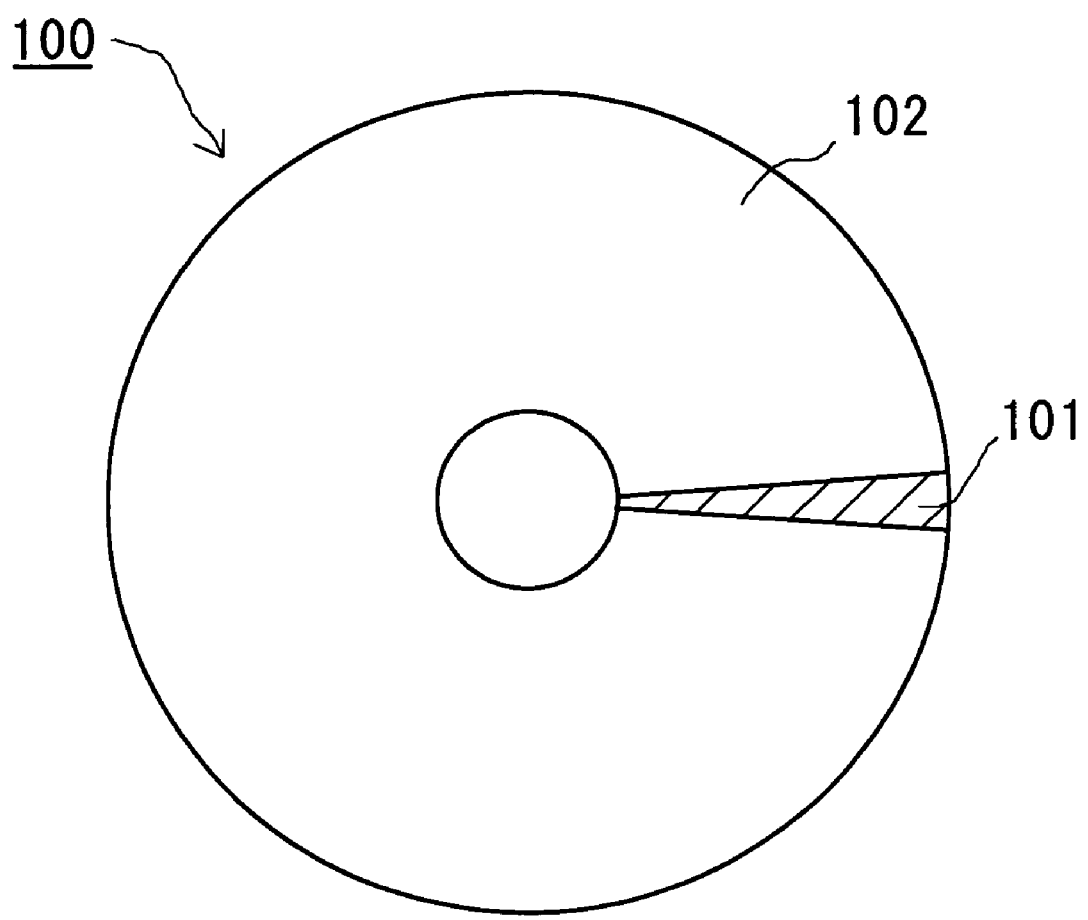
FIG. 7 is a schematic plan view showing still another example of the arrangement of the slit formation regions of the mediums according to the first and second embodiments of FIGS. 1 and 2 and the arrangement of the step formation regions of the mediums according to the third and fourth embodiments of FIGS. 3 and 4.

If the synchronization signal needs to be created only once for each rotation of the medium 100, the slit regions 31 may be formed in the single part 101, as shown in FIG. 7. Alternately, the slit regions 31 may be formed in the parts 101 formed intermittently in the radial direction, as shown in FIG. 8.

In the arrangement of FIG. 5, the slit regions 31 of the slit formation layer 3 may be arranged intermittently at a fixed angular period in radial directions. In this case, it is preferred that each of the slit regions 31 has a transmittance that varies continuously in a circumferential direction, as shown in FIG. 19.

Since the medium 100 is of the "substrate incidence" type, a material with a high optical transmittance (e.g., glass or resin such as polycarbonate) is used for the substrate 1. Regardless of whether the medium 100 is of the "substrate incidence" type or the "surface incidence" type, tracking grooves are formed on the substrate 1 in advance. To optically record information or data on the medium 100, the grooves and/or lands may be used.

To recognize the address on the medium 100 during the recording and reproducing operations, in addition to the tracking grooves, a "track ID", which contains the track address and other required information, may be formed on at least one point in each track, as shown in FIG. 5. Alternately, if the in-groove recording is adopted, pits may be formed intermittently on the unused lands. If the on-land recording is adopted, protrusions may be formed intermittently on the unused grooves. In these cases, the address information is defined and recognized by the existence or absence of the pits or protrusions.

As the material of the recording layer 2, any magneto-optical recording material may be used. In this case, the medium 100 is of the magneto-optical recording type. The recording layer 2 may have a multilayer structure comprising a lower protection sublayer, a magneto-optical recording sublayer, an upper protection sublayer, and a metal reflection sublayer. Each of the lower and upper protection sublayers may be made of a dielectric such as SiN and AlN. The magneto-optical recording sublayer may be made of an alloy of rare earth transition metals such as TbFe, GdTbFe, TbDyFe, TbFeCo, and GdFeCo. The magneto-optical recording sublayer may have a single-sublayer or multiple sublayer structure.

As the material of the recording layer 2, any phase-change recording material may be used. In this case, the medium 100 is of the phase-change recording type. The recording layer 2 may have (i) a multilayer structure comprising a first dielectric sublayer, a phase-change recording sublayer, a second dielectric sublayer, and a reflection sublayer; (ii) a multilayer structure comprising a first dielectric sublayer, a second dielectric sublayer, a phase-change recording sublayer, a third dielectric sublayer, and a reflection sublayer, or (iii) a multilayer structure comprising a first dielectric sublayer, a phase-change recording sublayer, a second dielectric sublayer, and a transparent reflection sublayer.

As the material of the recording layer 2, any phase-change recording material may be used. In this case, the medium 100 is of the phase-change recording type. Each of the lower and upper protection layer and the dielectric layers may be made of ZnS, $SiO_2$, ZnS—$SiO_2$, GeN, GeCrN, AlN, TaO, GeAlN, SiO, $Al_2O_3$, or SiN. Each of these sublayers may have a single-sublayer or multiple sublayer structure.

As the material of the recording sublayer, GbSbTe, GeSbSnTe, AgInSbTe, GeTe, SbTe, or InSbTe may be used. As the reflection sublayer, Al, Ag, Au, or NiCr, or an alloy containing at least two of these metals as its main constituent may be used. As the transparent reflection sublayer, Si, Ge, or an alloy containing Si and Ge as its main constituent may be used.

Next, the recording and reproducing method of the medium 100 according to the first embodiment is explained below.

In this method, the change of the reflected laser beam $L_{REF}$ caused by penetration of the slit formation layer 3 is used as the synchronization signal in the recording and reproducing operations. This is the feature of this method.

Figure 9A:
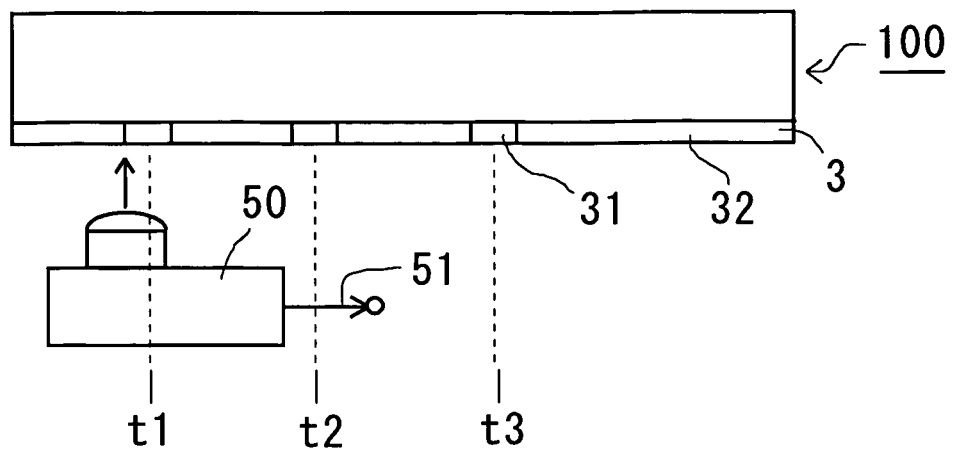
FIG. 9A is a schematic view showing the arrangement of the optical head and the medium according to the first or second embodiments of FIG. 1 or 2 in the recording or reproduction operation.

As shown in FIG. 9A, the laser beam emitted from the optical head 50 passes through the slit formation layer 3 and reflected by the recording layer 2 (which is not shown in FIG. 9A). Thereafter, the beam passes through the layer 3 again to return to the head 50. The reflected beam is detected by the optical detector (not shown) of the head 50. Since the slit regions 31 (or 101) have lower transmittance values than the non-slit regions 32 (or 102), the quantity of the reflected beam varies between the regions 31 or 32. Therefore, the output of the optical detector is lower when the beam passes through the regions 31 than that when the beam passes through the regions 32, as shown in FIG. 9B.

Figure 9B:
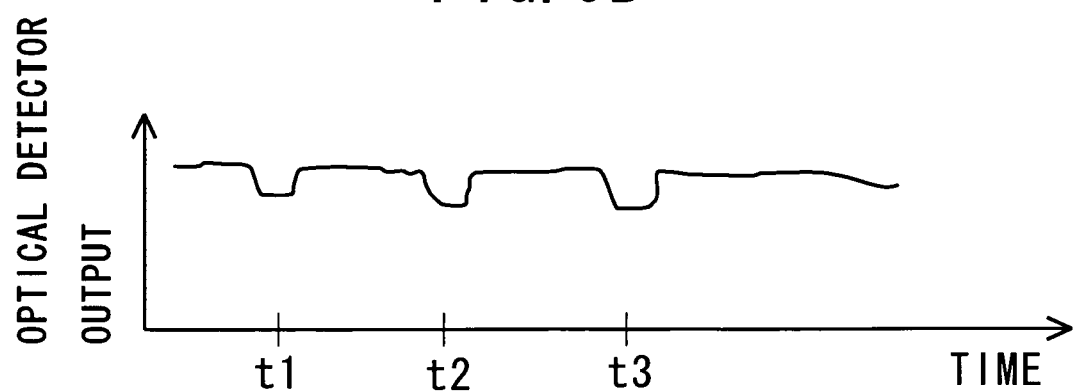
FIG. 9B is a waveform diagram of the output of the optical detector obtained from the medium according to the first or second embodiment of FIG. 1 or 2 in the recording or reproduction operation.
Figure 9C:
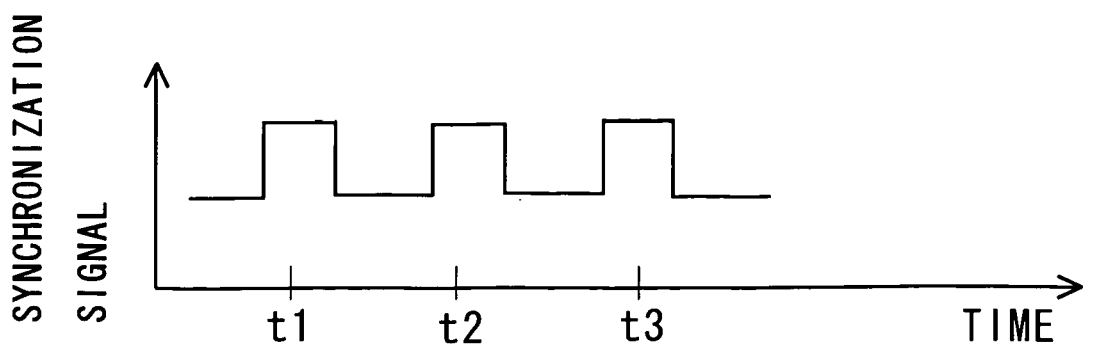
FIG. 9C is a waveform diagram of the synchronization signal obtained from the medium according to the first or second embodiment of FIG. 1 or 2 in the recording or reproduction operation.

For example, if the slit regions 31 are formed in such a way as to extend radially, as shown in FIG. 5, the synchronization signal can be generated based on the change of the output level of the detector of FIG. 9B using a PLL circuit.

Similarly, when the incident surface of the substrate 1 or the medium 100 itself is divided into the parts 101 and 102 by radial lines and concentric circles, as shown in FIG. 6, the synchronization signal can be generated based on the change of the output level of the detector of FIG. 9B using a PLL circuit.

To detect the reflectance change with the slit formation layer 3, the following method may be used.

For example, the reproduction laser beam is divided with a diffraction grating or the like to form multiple sub-beams. Then, the sub-beams are thickened to detect only the reflectance change at low frequencies. Alternately, the focusing positions of the sub-beams are shifted to their offset positions where the quantity change of the reflected beam is maximized, thereby detecting the quantity change of the sub-beams.

With the optical information-recording medium 100 according to the first embodiment of the invention, the transparent slit formation layer 3 is formed on the opposite main surface of the substrate 1 to the recording layer 2. The slit formation layer 3 allows the incident light beam $L_{IN}$ irradiated to the medium 100 to pass through, and allows the reflected light beam $L_{REF}$ from the recording layer 2 to pass through. Therefore, the incident light beam $L_{IN}$, which is irradiated to the recording layer 2 on the substrate 1, passes through the slit formation layer 3.

Since the slit formation layer 3 includes the slit regions 31 each having a transmittance relatively lower than the non-slit regions 32, the reflected light beam $L_{REF}$ is modulated by the slit regions 31. By deriving the change of amount of the reflected light beam $L_{REF}$, a clock signal or synchronization signal can be generated with a PLL circuit.

Accordingly, the slit formation layer 3 including the slit regions 31 constitutes a new means for deriving the synchronization signal without using the wobbling signal and the VFO signal.

Furthermore, the synchronization signal can be generated by using the slit formation layer 3 independent of the prepits preformatted on the substrate 11. Therefore, the wobbling signal and the VFO signal are unnecessary. This means that not only the disadvantages or problems caused by the wobbled grooves are solved but also the preformatting data is decreased.

As a result, with the medium 100 of the first embodiment, the formatting efficiency can be raised with a simple structure, which increases the available or recordable amount of information easily.

Second Embodiment

Figure 2:
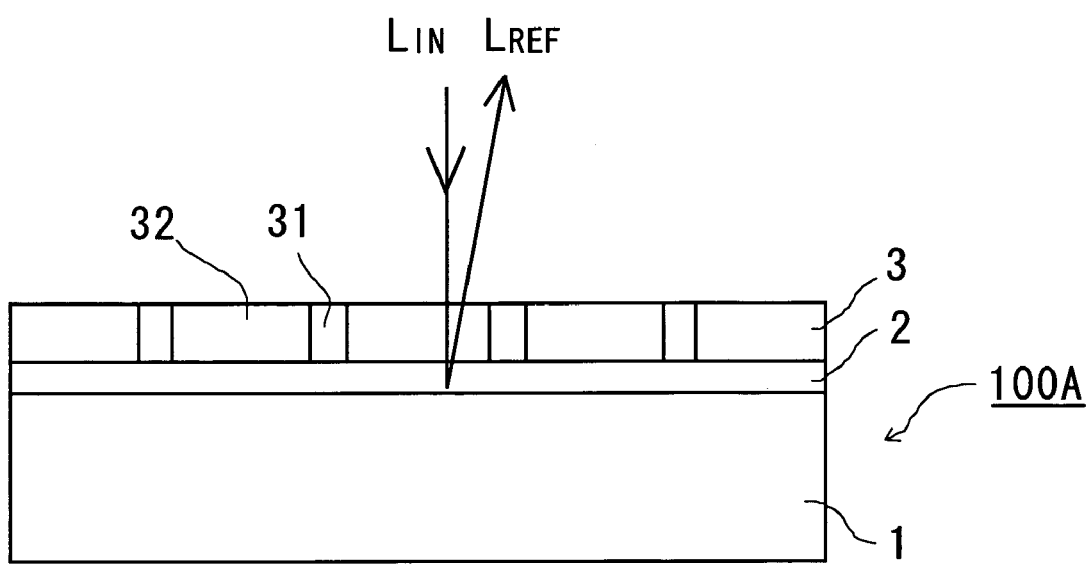
FIG. 2 is a schematic cross-sectional view showing the structure of an optical information-recording medium according to a second embodiment of the invention, which comprises the signal generation layer having the slit formation regions.

FIG. 2 shows an optical information-recording medium 100A according to a second embodiment of the invention.

As shown in FIG. 2, the medium 100A has the same structure as the medium 100 according to the first embodiment of FIG. 1 except that the recording layer 2 is located on the upper main surface of the substrate 1, and that the slit formation layer 3 is located on the layer 2. The upper main surface serves as the incident surface for a laser beam. The medium 100A is of the "surface incidence" type.

Since the medium 100A is of the "surface incidence" type, the incident light beam $L_{IN}$ is irradiated downwardly toward the upper main surface and then, the beam $L_{IN}$ penetrates the slit formation layer 3 and then, reflected by the recording layer 2, forming the reflected light beam $L_{REF}$. The reflected beam $L_{REF}$ penetrates the slit formation layer 3 and goes out of the medium 100A without penetration of the substrate 1.

Obviously, the medium 100A has the same advantages as those of the medium 100 of the first embodiment of FIG. 1.

Third Embodiment

Figure 3:
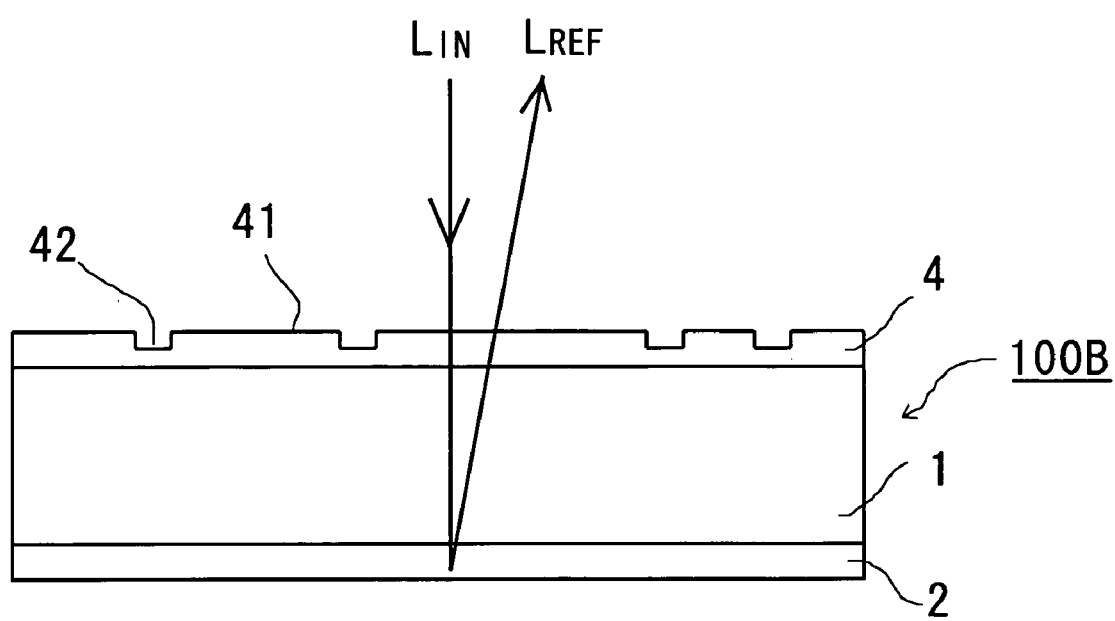
FIG. 3 is a schematic cross-sectional view showing the structure of an optical information-recording medium according to a third embodiment of the invention, which comprises the signal generation layer having the step formation regions.

FIG. 3 shows an optical information-recording medium 100B according to a third embodiment of the invention.

As shown in FIG. 3, the medium 100B has the same structure as the medium 100 according to the first embodiment of FIG. 1 except that a step formation layer (i.e., the signal generation layer) 4 is formed on the upper main surface of the substrate 1 instead of the slit formation layer 3. The medium 100B is of the "surface incidence" type like the medium 100 of the first embodiment.

Since the medium 100B is of the "substrate incidence" type, the incident light beam $L_{IN}$ is irradiated downwardly toward the upper main surface of the substrate 1 and then, the beam $L_{IN}$ enters the inside of the medium 100B. The beam $L_{IN}$ penetrates the step formation layer 4 and the substrate 1 and thereafter, reflected by the recording layer 2, forming the reflected light beam $L_{REF}$. The reflected beam $L_{REF}$ penetrates the substrate 1 and the step formation layer 4 and goes out of the medium 100B.

The step formation layer 4 is used to form steps, in other words, to form depressions or depressed regions 42 and the remaining non-depressed regions 41, on the incident surface of the medium 100B. The depressed regions 42 are smaller in thickness than the non-depressed regions 41.

The thickness difference between the regions 41 and 42 is formed on the basis of the focusing serve characteristic of an optical head used for recording and reproducing of information on/from the medium 100B. Specifically, the thickness difference is determined in such a way that the focusing error signal contains a desired variation or fluctuation due to the thickness difference between the regions 41 and 42 while the beam focusing performance of the head is not affected.

For example, when the wavelength of the laser beam is 650 nm, the NA (Numerical Aperture) of the focusing lens is 0.60, and the substrate 1 has a thickness of 0.6 mm, the thickness difference of the substrate 1 as much as approximately 20 μm applies no effect to the beam focusing performance. However, this thickness difference will create a recognizable offset in the focusing error signal. The structure of the medium 100B can be designed based on this fact.

For example, if the thickness of the substrate 1 is 0.5 mm, the thickness of the depressed regions 42 of the step formation layer 4 is 90 μm, and the thickness of the non-depressed regions 41 thereof is 100 μm, the focusing error signal contains a recognizable change between the regions 41 and 42. This makes it possible to detect the existence and absence of the steps formed by the regions 41 and 42. The steps or height difference between the regions 41 and 42 may be abrupt or gradual. If the change caused by this steps or height difference changes sufficiently faster with respect to the following or tracking speed of the focusing servo actuator, the steps or height difference between the regions 41 and 42 may be continuous. The steps or regions 42 may be formed by press forming or pattern transference of the pattern of a mold in the process of forming the step formation layer 4.

Next, the recording and reproducing method of the medium 100B according to the third embodiment of FIG. 3 is explained below.

Figure 10A:
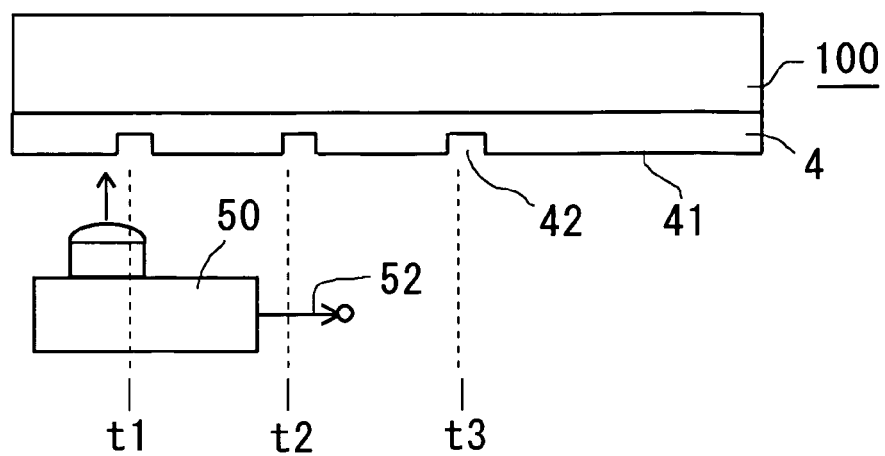
FIG. 10A is a schematic view showing the arrangement of the optical head and the medium according to the third or fourth embodiments of FIG. 3 or 4 in the recording or reproduction operation.

As shown in FIG. 10A, the laser beam emitted from the optical head 50 passes through the step formation layer 4 and reflected by the recording layer 2 (which is not shown in FIG. 10A). Thereafter, the beam passes through the layer 4 again to return to the head 50. The reflected beam is detected by the optical detector (not shown) of the head 50. Since the depressed regions 42 (or 102) have smaller thickness values than the non-depressed regions 41 (or 102), the focusing error signal contains some offset in the regions 31. Therefore, the focusing error signal is lower when the beam passes through the regions 42 than that when the beam passes through the regions 41, as shown in FIG. 10B.

Figure 10B:
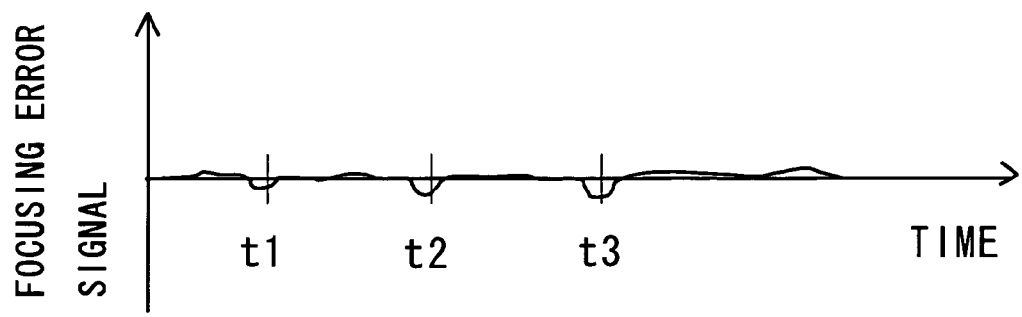
FIG. 10B is a waveform diagram of the focusing error signal obtained from the medium according to the third or fourth embodiment of FIG. 3 or 4 in the recording or reproduction operation.
Figure 10C:
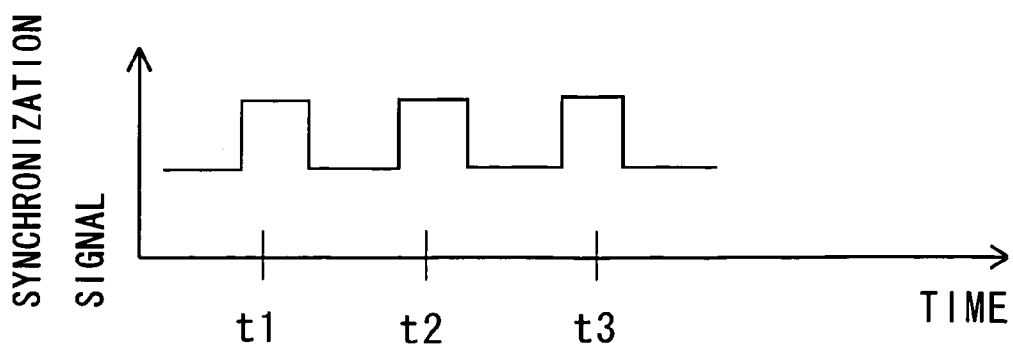
FIG. 10C is a waveform diagram of the synchronization signal obtained from the medium according to the third or fourth embodiment of FIG. 3 or 4 in the recording or reproduction operation.

For example, if the depressed regions 42 are formed in such a way as to extend radially, as shown in FIG. 5, the synchronization signal can be generated based on the offset change of the focusing error signal of FIG. 10B using a PLL circuit, as shown in FIG. 10C.

Similarly, when the incident surface of the substrate 1 or the medium 100B itself is divided into the parts 101 and 102 by radial lines and concentric circles, as shown in FIG. 6, the synchronization signal can be generated based on the offset change of the focusing error signal of FIG. 10B using a PLL circuit.

The focusing position may be set in such a way that just focusing occurs in the depressed (thinner) regions 42 of the layer 4 or in the non-depressed (thicker) regions 41 thereof.

Obviously, the medium 100A has the same advantages as chose of the medium 100 of the first embodiment of FIG. 1.

Fourth Embodiment

Figure 4:
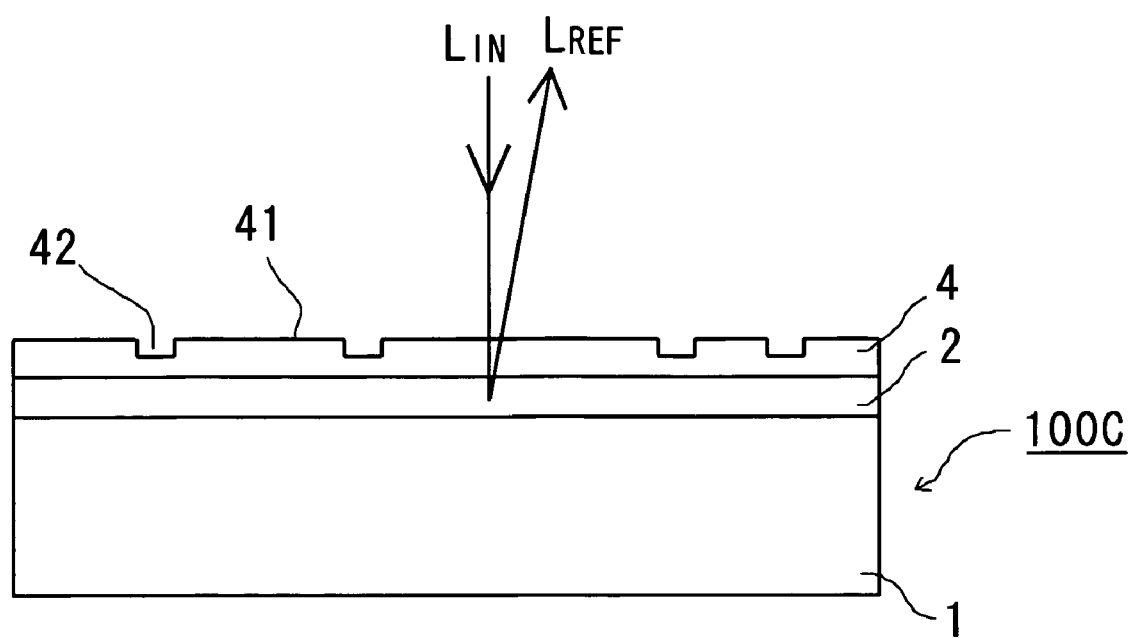
FIG. 4 is a schematic cross-sectional view showing the structure of an optical information-recording medium according to a fourth embodiment of the invention, which comprises the signal generation layer having the step formation regions.

FIG. 4 shows an optical information-recording medium 100C according to a fourth embodiment of the invention.

As shown in FIG. 4, the medium 100C has the same structure as the medium 100B according to the third embodiment of FIG. 3 except that the recording layer 2 is located on the upper main surface of the substrate 1, and that the step formation layer 4 is located on the layer 2. The upper main surface serves as the incident surface for a laser beam. The medium 100C is of the "surface incidence" type.

Since the medium 100C is of the "surface incidence" type, the incident light beam $L_{IN}$ is irradiated downwardly to the upper main surface of the substrate 1 and then, the beam $L_{IN}$ penetrates the step formation layer 4 and then, reflected by the recording layer 2, forming the reflected light beam $L_{REF}$. The reflected beam $L_{REF}$ penetrates the step formation layer 4 and goes out of the medium 100C without penetration of the substrate 1.

Obviously, the medium 100A has the same advantages as those of the medium 100 of the first embodiment of FIG. 1.

Description of Examples

Although the first to fourth embodiments of the present invention are explained as above, the invention will be described in more detail below with concrete examples.

Example 1

To confirm the availability of the invention, the optical information-recording medium (i.e., the optical disk) 100 of the substrate-incidence type shown in FIG. 1 was fabricated actually. The substrate 1 was made of a disk-shaped polycarbonate plate with the external diameter of 120 mm, the internal diameter of 15 mm, and a thickness of 0.5 mm. Spiral tracking grooves, each of which was 60 nm in depth and 0.40 µm in width, were formed in advance on the main surface of the polycarbonate plate at a pitch of 0.74 µm. Address information was recorded on the plate in such a way as to be located at a single position of each track, which were formed in the form of prepits.

Figure 11:
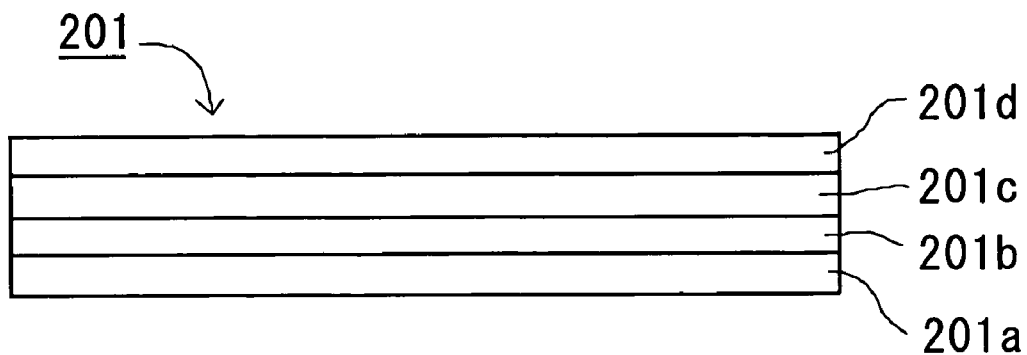
FIG. 11 is a schematic cross-sectional view showing the structure of the optical information-recording medium according to Examples 1 and 2 of the invention.

On the main surface of the substrate 1 thus formed, as shown in FIG. 11, a lower protection layer 201a of SiN, a magneto-optical recording layer 201b of TbFeCo, an upper protection layer 201c of SiN, and a metal reflection layer 201d of AlTi were successively formed by sputtering, thereby forming the recording layer 2 on the substrate 1. Subsequently, the slit formation layer 3 was adhered onto the lower main surface of the substrate 1 opposite to the recording layer 2 with a proper adhesive. The layer 3 was made of a polycarbonate film with a thickness of 100 µm, an external diameter of 120 mm, and an internal diameter of 15 mm.

The slit formation layer 3 had the slit regions 31 (101) formed by sputtering. The number of the regions 101 was four. The regions 101 were arranged at an angular period of 90° around the center of the substrate 1, like the arrangement of FIG. 5. The width of the region 101 was 0.5 mm when the radius of medium 100 was 25 mm. The width of the region 101 was 1.16 mm when the radius of medium 100 was 58 mm. Extremely thin layers of Au were formed to cover the respective regions 101. Due to the Au layers, the regions 11c 01 had a transmittance of 88%, which was lower than the non-slit regions 102 with a transmittance of 94%.

Thereafter, the medium 100 thus fabricated was subjected to its recording and reproduction operations with the optical head 50 for magneto-optical recording. The wavelength of the laser beam was 650 nm. The NA of the focusing lens was 0.60. As a result, the change of amount of the reflected light beam was confirmed due to the regions 101 and 102 and at the same time, the synchronization signals could be generated four times for each rotation of the medium 100 using the quantity change of the reflected light beam as a trigger.

Example 2

The optical information-recording medium 100 of the substrate-incidence type shown in FIG. 1 was fabricated actually. The substrate 1 was made of a disk-shaped polycarbonate plate with the external diameter of 120 mm, the internal diameter of 15 mm, and the thickness of 0.5 mm. Spiral tracking grooves, each of which was 60 nm in depth and 0.40 µm in width, were formed in advance on the main surface of the polycarbonate plate at a pitch of 0.74 µm. Address information was recorded on the plate in such a way as to be located at a single position of each track, which were formed in the form of prepits.

On the main surface of the substrate 1 thus formed, the recording layer 2 with the same structure as Example 1 was formed on the substrate 1. Subsequently, the slit formation layer 3 was adhered onto the lower main surface of the substrate 1 opposite to the recording layer 2 with a proper adhesive. The layer 3 was made of a polycarbonate film with a thickness of 100 µm, an external diameter of 120 mm, and an internal diameter of 15 mm.

The above-described structure was the same as the medium of Example 1.

The slit formation layer 3 had the slit regions 31 (101) formed by sputtering. The layer 3 was divided into parts by eight radial lines at a pitch of 45° and a specific number of concentric circles arranged at fixed intervals of 4 mm from the radius of 26 mm to that of 58 mm. The regions 101 were arranged in such a way that the radially and circumferentially adjoining regions 101 had different transmittances from each other, like the arrangement of FIG. 6. Extremely thin layers of Au were formed to cover the respective regions 101. Due to the Au layers, the regions 101 had a transmittance of 88%, which was lower than the non-slit formation regions 102 with a transmittance of 94%.

Thereafter, the medium 100 thus fabricated was subjected to its recording and reproduction operations with the optical head 50 for magneto-optical recording. The wavelength of the laser beam was 650 nm. The NA of the focusing lens was 0.60. As a result, the change of amount of the reflected light beam was confirmed due to the regions 101 and 102 and at the same time, the synchronization signals could be generated four times for each rotation of the medium 100 using the quantity change of the reflected light beam as a trigger.

Example 3

The optical information-recording medium 100C of the surface-incidence type shown in FIG. 4 was fabricated actually. The substrate 1 was made of a disk-shaped polycarbonate plate with the external diameter of 120 mm, the internal diameter of 15 mm, and a thickness of 1.1 mm. Spiral tracking grooves, each of which was 45 nm in depth and 0.30 μm in width, were formed in advance on the main surface of the polycarbonate plate at a pitch of 0.60 μm. Address information was recorded on the plate in such a way as to be located at a single position of each track, which were formed in the form of prepits.

Figure 12:
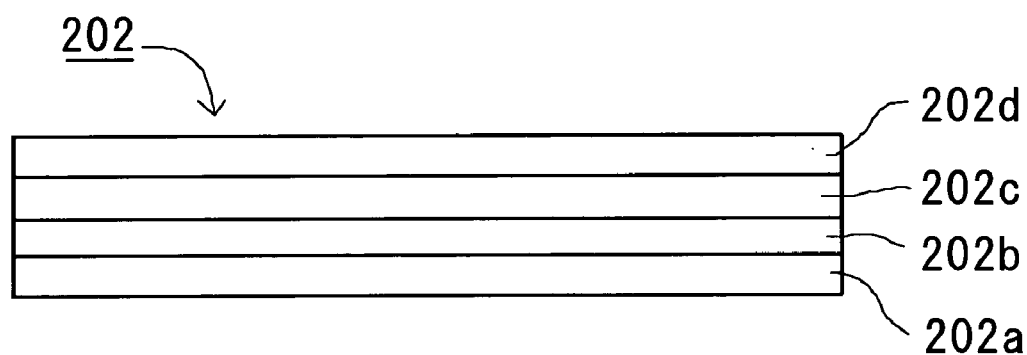
FIG. 12 is a schematic cross-sectional view showing the structure of the optical information-recording medium according to Examples 3 and 4 of the invention.

On the main surface of the substrate 1 thus formed, as shown in FIG. 12, a metal reflection layer 202a of AlTi, a lower protection layer 202b of SiN, a magneto-optical recording layer 202c of TbFeCo, and an upper protection layer 202d of SiN were successively formed by sputtering, thereby forming the recording layer 2 on the substrate 1. Subsequently, the step formation layer 4 was adhered onto the recording layer 2 with a proper adhesive. The layer 4 was made of a polycarbonate film with a thickness of 100 μm, an external diameter of 120 mm, and an internal diameter of 15 mm.

The step formation layer 4 had the depressed regions 42 (101) formed by sputtering. The number of the regions 101 was four. The regions 101 were arranged at an angular period of 90° around the center of the substrate 1, like the arrangement of FIG. 5. The width of the region 101 was 0.5 mm when the radius of medium 100 was 25 mm. The width of the region 101 was 1.16 mm when the radius of medium 100 was 58 mm. The thickness of the polycarbonate film was reduced to 98 μm in the regions 101 from 100 μm.

Thereafter, the medium 100C thus fabricated was subjected to its recording and reproduction operations with the optical head 50 for magneto-optical recording. The wavelength of the laser beam was 400 nm. The NA of the focusing lens was 0.75. As a result, the offset change of the focusing error signal was confirmed due to the regions 101 and 102 and at the same time, the synchronization signals could be generated four times for each rotation of the medium 100C using the offset change of the focusing error signal as a trigger.

Example 4

The optical information-recording medium 100C of the surface-incidence type shown in FIG. 4 was fabricated actually. The substrate 1 was made of a disk-shaped polycarbonate plate with the external diameter of 120 mm, the internal diameter of 15 mm, and a thickness of 1.1 mm. Spiral tracking grooves, each of which was 60 nm in depth and 0.30 μm in width, were formed in advance on the main surface of the polycarbonate plate at a pitch of 0.60 μm. Address information was recorded on the plate in such a way as to be located at a single position of each track, which were formed in the form of prepits.

On the main surface of the substrate 1 thus formed, the recording layer 2 with the same structure as Example 3 was formed on the substrate 1.

The step formation layer 4 had the depressed regions 42 (101) formed by sputtering. The layer 4 was divided into parts by eight radial lines at a pitch of 45° and a specific number of concentric circles arranged at fixed intervals of 4 mm from the radius of 26 mm to that of 58 mm, like the arrangement of FIG. 6. The thickness of the polycarbonate film was reduced to 98 μm in the regions 101 from 100 μm.

Thereafter, the medium 100C thus fabricated was subjected to its recording and reproduction operations with the optical head 50 for magneto-optical recording. The wavelength of the laser beam was 400 nm. The NA of the focusing lens was 0.75. As a result, the offset change of the focusing error signal was confirmed due to the regions 101 and 102 and at the same time, the synchronization signals could be generated four times for each rotation of the medium 100C using the offset change of the focusing error signal as a trigger.

Example 5

The optical information-recording medium 100 of the substrate-incidence type shown in FIG. 1 was fabricated actually. The substrate 1 was made of a disk-shaped polycarbonate plate with the external diameter of 120 mm, the internal diameter of 15 mm, and a thickness of 0.5 mm. Spiral tracking grooves, each of which was 60 nm in depth and 0.40 μm in width, were formed in advance on the main surface of the polycarbonate plate at a pitch of 0.74 μm. Address information was recorded on the plate in such a way as to be located at a single position of each track, which were formed in the form of prepits.

Figure 13:
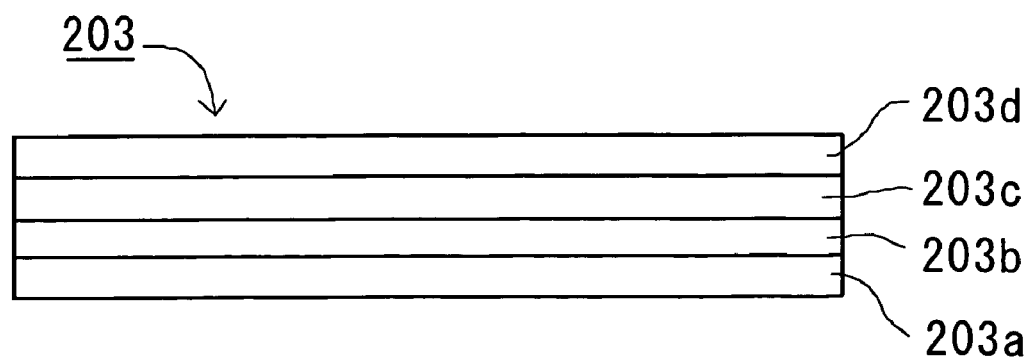
FIG. 13 is a schematic cross-sectional view showing the structure of the optical information-recording medium according to Examples 5 and 6 of the invention.

On the main surface of the substrate 1 thus formed, as shown in FIG. 13, a first dielectric layer 203a of $ZnS-SiO_2$, a phase-change recording layer 203b of GeSbTe, a second dielectric layer 203c of $ZnS-SiO_2$, and a metal reflection layer 203d of AlTi were successively formed by sputtering, thereby forming the recording layer 2 on the substrate 1. Subsequently, the slit formation layer 3 was adhered onto the lower main surface of the substrate 1 opposite to the recording layer 2 with a proper adhesive. The layer 3 was made of a polycarbonate film with a thickness of 100 μm, an external diameter of 120 mm, and an internal diameter of 15 mm.

The slit formation layer 3 had the slit regions 31 (101) formed by sputtering. The number of the regions 101 was four. The regions 101 were arranged at an angular period of 90° around the center of the substrate 1, like the arrangement of FIG. 5. The width of the region 101 was 0.5 mm when the radius of medium 100 was 25 mm. The width of the region 101 was 1.16 mm when the radius of medium 100 was 58 mm. Extremely thin layers of Au were formed to cover the respective regions 101. Due to the Au layers, the regions 101 had a transmittance of 88%, which was lower than the non-slit regions 102 with a transmittance of 94%.

Thereafter, the medium 100 thus fabricated was subjected to its recording and reproduction operations with the optical head 50 for phase-change recording. The wavelength of the laser beam was 650 nm. The NA of the focusing lens was 0.60. As a result, the change of amount of the reflected light beam was confirmed due to the regions 101 and 102 and at the same time, the synchronization signals could be generated four times for each rotation of the medium 100 using the quantity change of the reflected light beam as a trigger.

Example 6

The optical information-recording medium 100 of the substrate-incidence type shown in FIG. 1 was fabricated actually. The substrate 1 was made of a disk-shaped polycarbonate plate with the external diameter of 120 mm, the internal diameter of 15 mm, and the thickness of 0.5 mm. Spiral tracking grooves, each of which was 60 nm in depth and 0.40 µm in width, were formed in advance on the main surface of the polycarbonate plate at a pitch of 0.74 µm. Address information was recorded on the plate in such a way as to be located at a single position of each track, which were formed in the form of prepits.

On the main surface of the substrate 1 thus formed, the recording layer 2 with the same structure as Example 5 was formed on the substrate 1.

The slit formation layer 3 had the slit regions 31 (101) formed by sputtering. The layer 3 was divided into parts by eight radial lines at a pitch of 45° and a specific number of concentric circles arranged at fixed intervals of 4 mm from the radius of 26 mm to that of 58 mm. The regions 101 were arranged in such a way that the radially and circumferentially adjoining regions 101 had different transmittances from each other, like the arrangement of FIG. 6. Extremely thin layers of Au were formed to cover the respective regions 101. Due to the Au layers, the regions 101 had a transmittance of 88%, which was lower than the non-slit regions 102 with a transmittance of 94%.

Thereafter, the medium 100 thus fabricated was subjected to its recording and reproduction operations with the optical head 50 for phase-change recording. The wavelength of the laser beam was 650 nm. The NA of the focusing lens was 0.60. As a result, the change of amount of the reflected light beam was confirmed due to the regions 101 and 102 and at the same time, the synchronization signals could be generated four times for each rotation of the medium 100 using the quantity change of the reflected light beam as a trigger.

Example 7

The optical information-recording medium 100C of the surface-incidence type shown in FIG. 4 was fabricated actually. The substrate 1 was made of a disk-shaped polycarbonate plate with the external diameter of 120 mm, the internal diameter of 15 mm, and a thickness of 1.1 mm. Spiral tracking grooves, each of which was 45 nm in depth and 0.30 µm in width, were formed in advance on the main surface of the polycarbonate plate at a pitch of 0.60 µm. Address information was recorded on the plate in such a way as to be located at a single position of each track, which were formed in the form of prepits.

Figure 14:
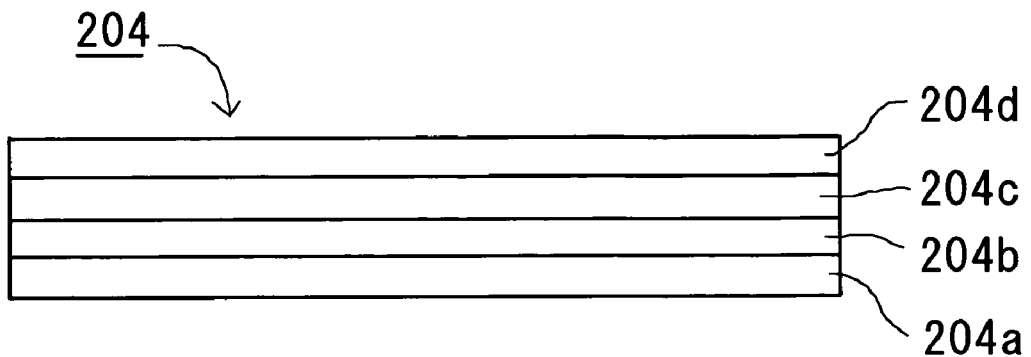
FIG. 14 is a schematic cross-sectional view showing the structure of the optical information-recording medium according to Examples 7 and 8 of the invention.

On the main surface of the substrate 1 thus formed, as shown in FIG. 14, a metal reflection layer 204a of AlTi, a first dielectric layer 204b of ZnS—SiO$_2$, a phase-change recording layer 204c of GeSbTe, and a second dielectric layer 204d of ZnS—SiO$_2$ were successively formed by sputtering, thereby forming the recording layer 2 on the substrate 1. Subsequently, the step formation layer 4 was adhered onto the recording layer 2 with a proper adhesive. The layer 4 was made of a polycarbonate film with a thickness of 100 µm, an external diameter of 120 mm, and an internal diameter of 15 mm.

The step formation layer 4 had the depressed regions 42 (101) formed by sputtering. The number of the regions 101 was four. The regions 101 were arranged at an angular period of 90° around the center of the substrate 1, like the arrangement of FIG. 5. The width of the region 101 was 0.5 mm when the radius of medium 100 was 25 mm. The width of the region 101 was 1.16 mm when the radius of medium 100 was 58 mm. The thickness of the polycarbonate film was reduced to 98 µm in the regions 101 from 100 µm.

Thereafter, the medium 100C thus fabricated was subjected to its recording and reproduction operations with the optical head 50 for phase-change recording. The wavelength of the laser beam was 400 nm. The NA of the focusing lens was 0.75. As a result, the offset change of the focusing error signal was confirmed due to the regions 101 and 102 and at the same time, the synchronization signals could be generated four times for each rotation of the medium 100C using the offset change of the focusing error signal as a trigger.

Example 8

The optical information-recording medium 100C of the surface-incidence type shown in FIG. 4 was fabricated actually. The substrate 1 was made of a disk-shaped polycarbonate plate with the external diameter of 120 mm, the internal diameter of 15 mm, and a thickness of 1.1 mm. Spiral tracking grooves, each of which was 60 nm in depth and 0.30 µm in width, were formed in advance on the main surface of the polycarbonate plate at a pitch of 0.60 µm. Address information was recorded on the plate in such a way as to be located at a single position of each track, which were formed in the form of prepits.

On the main surface of the substrate 1 thus formed, the recording layer 2 with the same structure as Example 7 was formed on the substrate 1.

The step formation layer 4 had the depressed regions 42 (101) formed by sputtering. The layer 4 was divided into parts by press forming by eight radial lines at a pitch of 45° and a specific number of concentric circles arranged at fixed intervals of 4 mm from the radius of 26 mm to that of 58 mm, like the arrangement of FIG. 6. The thickness of the polycarbonate film was reduced to 98 µm in the regions 101 from 100 µm.

Thereafter, the medium 100C thus fabricated was subjected to its recording and reproduction operations with the optical head 50 for phase-change recording. The wavelength of the laser beam was 400 nm. The NA of the focusing lens was 0.75. As a result, the offset change of the focusing error signal was confirmed due to the regions 101 and 102 and at the same time, the synchronization signals could be generated four times for each rotation of the medium 100C using the offset change of the focusing error signal as a trigger.

Example 9

The optical information-recording medium 100 of the substrate-incidence type shown in FIG. 1 was fabricated actually. The substrate 1 was made of a disk-shaped polycarbonate plate with the external diameter of 120 mm, the internal diameter of 15 mm, and a thickness of 0.5 mm. Spiral tracking grooves, each of which was 60 nm in depth and 0.40 µm in width, were formed in advance on the main surface of the polycarbonate plate at a pitch of 0.74 µm. The tracking grooves were designed for the in-groove recording. Address information was recorded on the plate in such a way that the lands extend intermittently.

Figure 15:
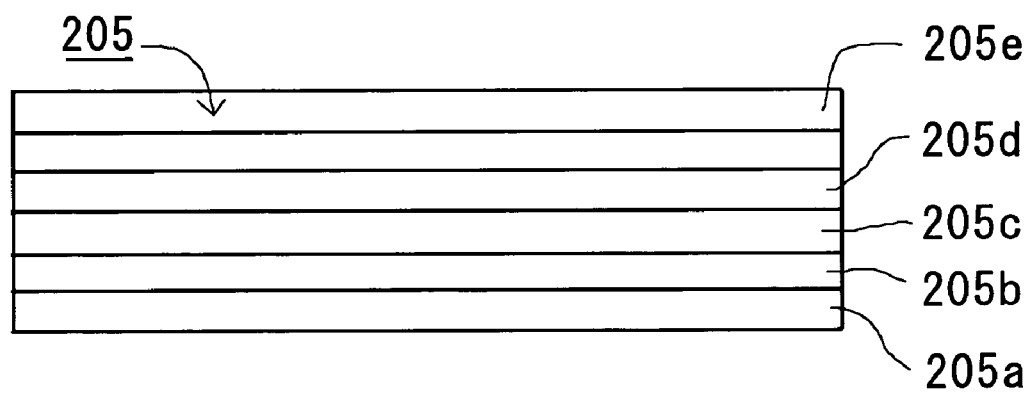
FIG. 15 is a schematic cross-sectional view showing the structure of the optical information-recording medium according to Examples 0 and 10 of the invention.

On the main surface of the substrate 1 thus formed, as shown in FIG. 15, a first dielectric layer 205a of SiO$_2$, a second dielectric layer 205b of ZnS—SiO$_2$, a phase-change recording layer 205c of GeSbTe, a third dielectric layer 205d of ZnS—SiO$_2$, and a reflection layer 205e of AlTi were successively formed by sputtering, thereby forming the recording layer 2 on the substrate 1. Subsequently, the slit formation layer 3 was adhered onto the lower main surface of the substrate 1 opposite to the recording layer 2 with a proper adhesive. The layer 3 was made of a polycarbonate film with a thickness of 100 μm, an external diameter of 120 mm, and an internal diameter of 15 mm.

The slit formation layer 3 had the slit regions 31 (101) formed by sputtering. The number of the regions 101 was four. The regions 101 were arranged at an angular period of 90° around the center of the substrate 1, like the arrangement of FIG. 5. The width of the region 101 was 0.5 mm when the radius of medium 100 was 25 mm. The width of the region 101 was 1.1 mm when the radius of medium 100 was 58 mm. Extremely thin layers of Au were formed to cover the respective regions 101. Due to the Au layers, the regions 101 had a transmittance of 88%, which was lower than the non-slit regions 102 with a transmittance of 94%.

Thereafter, the medium 100 thus fabricated was subjected to its recording and reproduction operations with the optical head 50 for phase-change recording. The wavelength of the laser beam was 650 nm. The NA of the focusing lens was 0.60. As a result, the change of amount of the reflected light beam was confirmed due to the regions 101 and 102 and at the same time, the synchronization signals could be generated four times for each rotation of the medium 100 using the quantity change of the reflected light beam as a trigger.

Example 10

The optical information-recording medium 100 of the substrate-incidence type shown in FIG. 1 was fabricated actually. The substrate 1 was made of a disk-shaped polycarbonate plate with the external diameter of 120 mm, the internal diameter of 15 mm, and the thickness of 0.5 mm. Spiral tracking grooves, each of which was 60 nm in depth and 0.40 μm in width, were formed in advance on the main surface of the polycarbonate plate at a pitch of 0.74 μm. The tracking grooves were designed for the in-groove recording. Address information was recorded on the plate in such a way that the lands extend intermittently.

On the main surface of the substrate 1 thus formed, the recording layer 2 with the same structure as Example 9 was formed on the substrate 1. Subsequently, the slit formation layer 3 was adhered onto the lower main surface of the substrate 1 opposite to the recording layer 2 with a proper adhesive. The layer 3 was made of a polycarbonate film with a thickness of 100 μm, an external diameter of 120 mm, and an internal diameter of 15 mm.

The slit formation layer 3 had the slit regions 31 (101) formed by sputtering. The layer 3 was divided into parts by eight radial lines at a pitch of 45° and a specific number of concentric circles arranged at fixed intervals of 4 mm from the radius of 26 mm to that of 58 mm. The regions 101 were arranged in such a way that the radially and circumferentially adjoining regions 101 had different transmittances from each other, like the arrangement of FIG. 6. Extremely thin layers of Au were formed to cover the respective regions 101. Due to the Au layers, the regions 101 had a transmittance of 88%, which was lower than the non-slit regions 102 with a transmittance of 94%.

Thereafter, the medium 100 thus fabricated was subjected to its recording and reproduction operations with the optical head 50 for phase-change recording. The wavelength of the laser beam was 650 nm. The NA of the focusing lens was 0.60. As a result, the change of amount of the reflected light beam was confirmed due to the regions 101 and 102 and at the same time, the synchronization signals could be generated four times for each rotation of the medium 100 using the quantity change of the reflected light beam as a trigger.

Example 11

The optical information-recording medium 100C of the surface-incidence type shown in FIG. 4 was fabricated actually. The substrate 1 was made of a disk-shaped polycarbonate plate with the external diameter of 120 mm, the internal diameter of 15 mm, and a thickness of 1.1 mm. Spiral tracking grooves, each of which was 45 nm in depth and 0.30 μm in width, were formed in advance on the main surface of the polycarbonate plate at a pitch of 0.60 μm. The tracking grooves were designed for the in-groove recording. Address information was recorded on the plate in such a way that the lands extend intermittently.

Figure 16:
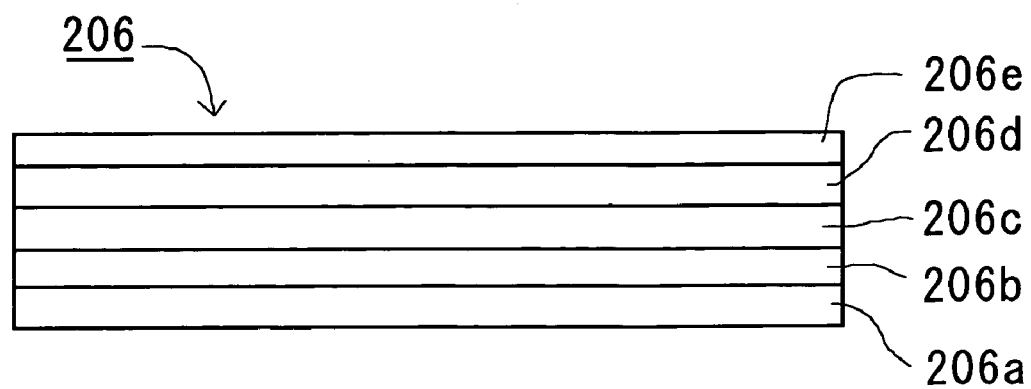
FIG. 16 is a schematic cross-sectional view showing the structure of the optical information-recording medium according to Examples 11 and 12 of the invention.

On the main surface of the substrate 1 thus formed, as shown in FIG. 16, a metal reflection layer 206a of AlTi, a first dielectric layer 206b of ZnS—SiO$_2$, a phase-change recording layer 206c of GeSbTe, a second dielectric layer 206d of ZnS—SiO$_2$, and a third dielectric layer 206e of ZnS—SiO$_2$ were successively formed by sputtering, thereby forming the recording layer 2 on the substrate 1. Subsequently, the step formation layer 4 was adhered onto the recording layer 2 with a proper adhesive. The layer 4 was made of a polycarbonate film with a thickness of 100 μm, an external diameter of 120 mm, and an internal diameter of 15 mm.

The step formation layer 4 had the depressed regions 42 (101) formed by sputtering. The number of the regions 101 was four. The regions 101 were arranged at an angular period of 90° around the center of the substrate 1, like the arrangement of FIG. 5. The width of the region 101 was 0.5 mm when the radius of medium 100 was 25 mm. The width of the region 101 was 1.16 mm when the radius of medium 100 was 58 mm. The thickness of the polycarbonate film was reduced to 98 μm in the regions 101 from 100 μm.

Thereafter, the medium 100C thus fabricated was subjected to its recording and reproduction operations with the optical head 50 for phase-change recording. The wavelength of the laser beam was 400 nm. The NA of the focusing lens was 0.75. As a result, the offset change of the focusing error signal was confirmed due to the regions 101 and 102 and at the same lime, the synchronization signals could be generated four times for each rotation of the medium 100C using the offset change of the focusing error signal as a trigger.

Example 12

The optical information-recording medium 100C of the surface-incidence type shown in FIG. 4 was fabricated actually. The substrate 1 was made of a disk-shaped polycarbonate plate with the external diameter of 120 mm, the internal diameter of 15 mm, and a thickness of 1.1 mm. Spiral tracking grooves, each of which was 60 nm in depth and 0.30 μm in width, were formed in advance on the main surface of the polycarbonate plate at a pitch of 0.60 μm. The tracking grooves were designed for the in-groove recording. Address information was recorded on the plate in such a way that the lands extend intermittently.

On the main surface of the substrate 1 thus formed, the recording layer 2 with the same structure as Example 11 was formed on the substrate 1. Subsequently, the step formation layer 4 was adhered onto the recording layer 2 with a proper adhesive. The layer 4 was made of a polycarbonate film with a thickness of 100 μm, an external diameter of 120 mm, and an internal diameter of 15 mm.

The step formation layer 4 had the depressed regions 42 (101) formed by sputtering. The layer 4 was divided into parts by press forming by eight radial lines at a pitch of 45° and a specific number of concentric circles arranged at fixed intervals of 4 mm from the radius of 26 mm to that of 58 mm, like the arrangement of FIG. 6. The thickness of the polycarbonate film was reduced to 98 μm in the regions 101 from 100 μm.

Thereafter, the medium 100C thus fabricated was subjected to its recording and reproduction operations with the optical head 50 for phase-change recording. The wavelength of the laser beam was 400 nm. The NA of the focusing lens was 0.75. As a result, the offset change of the focusing error signal was confirmed due to the regions 101 and 102 and at the same time, the synchronization signals could be generated four times for each rotation of the medium 100C using the offset change of the focusing error signal as a trigger.

Example 13

The optical information-recording medium 100 of the substrate-incidence type shown in FIG. 1 was fabricated actually. The substrate 1 was made of a disk-shaped polycarbonate plate with the external diameter of 120 mm, the internal diameter of 15 mm, and a thickness of 0.5 mm. Spiral tracking grooves, each of which was 60 nm in depth and 0.40 μm in width, were formed in advance on the main surface of the polycarbonate plate at a pitch of 0.74 μm. The tracking grooves were designed for the in-groove recording. Address information was recorded on the plate in such a way that the lands extend intermittently.

On the main surface of the substrate 1 thus formed, as shown in FIG. 17, a first dielectric layer 207a of ZnS—SiO$_2$, a phase-change recording layer 207b of GeSbTe, a second dielectric layer 207c of ZnS—SiO$_2$, and a transparent reflection layer 207d of Si were successively formed by sputtering, thereby forming the recording layer 2 on the substrate 1. Subsequently, the slit formation layer 3 was adhered onto the lower main surface of the substrate 1 opposite to the recording layer 2 with a proper adhesive. The layer 3 was made of a polycarbonate film with a thickness of 100 μm, an external diameter of 120 mm, and an internal diameter of 15 mm.

The slit formation layer 3 had the slit regions 31 (101) formed by sputtering. The number of the regions 101 was four. The regions 101 were arranged at an angular period of 90° around the center of the substrate 1, like the arrangement of FIG. 5. The width of the region 101 was 0.5 mm when the radius of medium 100 was 25 mm. The width of the region 101 was 1.16 mm when the radius of medium 100 was 58 mm. Extremely thin layers of Au were formed to cover the respective regions 101. Due to the Au layers, the regions 101 had a transmittance of 88%, which was lower than the non-slit regions 102 with a transmittance of 94%.

Thereafter, the medium 100 thus fabricated was subjected to its recording and reproduction operations with the optical head 50 for phase-change recording. The wavelength of the laser beam was 650 nm. The NA of the focusing lens was 0.60. As a result, the change of amount of the reflected light beam was confirmed due to the regions 101 and 102 and at the same time, the synchronization signals could be generated four times for each rotation of the medium 100 using the quantity change of the reflected light beam as a trigger.

Example 14

The optical information-recording medium 100 of the substrate-incidence type shown in FIG. 1 was fabricated actually. The substrate 1 was made of a disk-shaped polycarbonate plate with the external diameter of 120 mm, the internal diameter of 15 mm, and the thickness of 0.5 mm. Spiral tracking grooves, each of which was 60 nm in depth and 0.40 μm in width, were formed in advance on the main surface of the polycarbonate plate at a pitch of 0.74 μm. The tracking grooves were designed for the in-groove recording. Address information was recorded on the plate in such a way that the lands extend intermittently.

On the main surface of the substrate 1 thus formed, the recording layer 2 with the same structure as Example 13 was formed on the substrate 1. Subsequently, the slit formation layer 3 was adhered onto the lower main surface of the substrate 1 opposite to the recording layer 2 with a proper adhesive. The layer 3 was made of a polycarbonate film with a thickness of 100 μm, an external diameter of 120 mm, and an internal diameter of 15 mm.

The slit formation layer 3 had the slit regions 31 (101) formed by sputtering. The layer 3 was divided into parts by eight radial lines at a pitch of 45° and a specific number of concentric circles arranged at fixed intervals of 4 mm from the radius of 26 mm to that of 58 mm. The regions 101 were arranged in such a way that the radially and circumferentially adjoining regions 101 had different transmittances from each other, like the arrangement of FIG. 6. Extremely thin layers of Au were formed to cover the respective regions 101. Due to the Au layers, the regions 101 had a transmittance or 88%, which was lower than the non-slit regions 102 with a transmittance of 94%.

Thereafter, the medium 100 thus fabricated was subjected to its recording and reproduction operations with the optical head 50 for phase-change recording. The wavelength of the laser beam was 650 nm. The NA of the focusing lens was 0.60. As a result, the change of amount of the reflected light beam was confirmed due to the regions 101 and 102 and at the same time, the synchronization signals could be generated four times for each rotation of the medium 100 using the quantity change of the reflected light beam as a trigger.

Example 15

The optical information-recording medium 100C of the surface-incidence type shown in FIG. 4 was fabricated actually. The substrate 1 was made of a disk-shaped polycarbonate plate with the external diameter of 120 mm, the internal diameter of 15 mm, and a thickness of 1.1 mm. Spiral tracking grooves, each of which was 45 nm in depth and 0.30 μm in width, were formed in advance on the main surface of the polycarbonate plate at a pitch of 0.60 μm. The tracking grooves were designed for the in-groove recording. Address information was recorded on the plate in such a way that the lands extend intermittently.

On the main surface of the substrate 1 thus formed, as shown in FIG. 18, a transparent reflection layer 208a of Si, a first dielectric layer 208b of ZnS—SiO$_2$, a phase-change recording layer 208c of GeSbTe, and a second dielectric layer 208d of ZnS—SiO$_2$ were successively formed by sputtering, thereby forming the recording layer 2 on the substrate 1. Subsequently, the step formation layer 4 was adhered onto the recording layer 2 with a proper adhesive. The layer 4 was made of a polycarbonate film with a thickness of 100 μm, an external diameter of 120 mm, and an internal diameter of 15 mm.

The step formation layer 4 had the depressed regions 42 (101) formed by sputtering. The number of the regions 101 was four. The regions 101 were arranged at an angular period of 90° around the center of the substrate 1, like the arrangement of FIG. 5. The width of the region 101 was 0.5 mm when the radius of medium 100 was 25 mm. The width of the region 101 was 1.16 mm when the radius of medium 100 was 58 mm. The thickness of the polycarbonate film was reduced to 98 μm in the regions 101 from 100 μm.

Thereafter, the medium 100C thus fabricated was subjected to its recording and reproduction operations with the optical head 50 for phase-change recording. The wavelength of the laser beam was 400 nm. The NA of the focusing lens was 0.75. As a result, the offset change of the focusing error signal was confirmed due to the regions 101 and 102 and at the same time, the synchronization signals could be generated four times for each rotation of the medium 100C using the offset change of the focusing error signal as a trigger.

Example 16

The optical information recording medium 100C of the surface-incidence type shown in FIG. 4 was fabricated actually. The substrate 1 was made of a disk-shaped polycarbonate plate with the external diameter of 120 mm, the internal diameter of 15 mm, and a thickness of 1.1 mm. Spiral tracking grooves, each of which was 60 nm in depth and 0.30 µm in width, were formed in advance on the main surface of the polycarbonate plate at a pitch of 0.60 µm. The tracking grooves were designed for the in-groove recording. Address information was recorded on the plate in such a way that the lands extend intermittently.

On the main surface of the substrate 1 thus formed, the recording layer 2 with the same structure as Example 15 was formed on the substrate 1. Subsequently, the step formation layer 4 was adhered onto the recording layer 2 with a proper adhesive. The layer 4 was made of a polycarbonate film with a thickness of 100 µm, an external diameter of 120 mm, and an internal diameter of 15 mm.

The step formation layer 4 had the depressed regions 42 (101) formed by sputtering. The layer 4 was divided into parts by press forming by eight radial lines at a pitch of 45° and a specific number of concentric circles arranged at fixed intervals of 4 mm from the radius of 26 mm to that of 58 mm, like the arrangement of FIG. 6. The thickness of the polycarbonate film was reduced to 99 µm in the regions 101 from 100 µm.

Thereafter, the medium 100C thus fabricated was subjected to its recording and reproduction operations with the optical head 50 for phase-change recording. The wavelength of the laser beam was 400 nm. The NA of the focusing lens was 0.75. As a result, the offset change of the focusing error signal was confirmed due to the regions 101 and 102 and at the same time, the synchronization signals could be generated four times for each rotation of the medium 100C using the offset change of the focusing error signal as a trigger.

VARIATIONS

Needless to say, the present invention is not limited to the above-described embodiment Any change or modification may be added to the optical information-recording medium and the optical information recording/reproduction method within the spirit of the invention. For example, the signal generation layer 3 or 4 may have any other structure and the recording layer 2 may have any other structure.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. An optical information-recording medium comprising:
(a) a disk-shaped substrate having a first main surface and an a second main surface opposite to the first main surface;
an incidence surface of the medium being located to be nearer to the first main surface than the second main surface;
(b) a recording layer formed on the substrate; and
(c) a signal generation layer formed on the substrate in such a way as to be nearer to the incident surface than the recording layer;
the signal generation layer allowing an incident light beam irradiated to the incidence surface to pass through and allowing a reflected light beam from the recording layer to pass through;
the signal generation layer including a transmittance changing region;
the transmittance changing region having a transmittance with respect to the incident light beam different from its neighborhood, thereby generating a repeated transmittance change according to rotation of the medium,
wherein the recording layer has a multilayer structure comprising a lower protection sublayer, a magneto-optical recording sublayer, an upper protection sublayer, and a metal reflection sublayer;
and wherein the recording layer is formed on the first main surface of the substrate while the signal generation layer is formed on the second main surface of the substrate.

2. An optical information-recording medium comprising:
(a) a disk-shaped substrate having a first main surface and an a second main surface opposite to the first main surface;
an incidence surface of the medium being located to be nearer to the first main surface than the second main surface;
(b) a recording layer formed on the substrate; and
(c) a signal generation layer formed on the substrate in such a way as to be nearer to the incident surface than the recording layer;
the signal generation layer allowing an incident light beam irradiated to the incidence surface to pass through and allowing a reflected light beam from the recording layer to pass through;
the signal generation layer including a transmittance changing region;
the transmittance changing region having a transmittance with respect to the incident light beam different from its neighborhood, thereby generating a repeated transmittance change according to rotation of the medium,
wherein the recording layer has a multilayer structure comprising a first dielectric sublayer, a phase-change recording sublayer, a second dielectric sublayer, and a reflection sublayer;
and wherein the recording layer is formed on the first main surface of the substrate while the signal generation layer is formed on the second main surface of the substrate.

3. An optical information-recording medium comprising:
(a) a disk-shaped substrate having a first main surface and an a second main surface opposite to the first main surface;
an incidence surface of the medium being located to be nearer to the first main surface than the second main surface;
(b) a recording layer formed on the substrate; and
(c) a signal generation layer formed on the substrate in such a way as to be nearer to the incident surface than the recording layer;
the signal generation layer allowing an incident light beam irradiated to the incidence surface to pass through and allowing a reflected light beam from the recording layer to pass through;
the signal generation layer including a transmittance changing region;

the transmittance changing region having a transmittance with respect to the incident light beam different from its neighborhood, thereby generating a repeated transmittance change according to rotation of the medium, wherein the recording layer has a multilayer structure comprising a first dielectric sublayer, a second dielectric sublayer, a phase-change recording sublayer, a third dielectric sublayer, and a reflection sublayer;

and wherein the recording layer is formed on the first main surface of the substrate while the signal generation layer is formed on the second main surface of the substrate.

4. An optical information-recording medium comprising:
(a) a disk-shaped substrate having a first main surface and an a second main surface opposite to the first main surface;
an incidence surface of the medium being located to be nearer to the first main surface than the second main surface;
(b) a recording layer formed on the substrate; and
(c) a signal generation layer formed on the substrate in such a way as to be nearer to the incident surface than the recording layer;
the signal generation layer allowing an incident light beam irradiated to the incidence surface to pass through and allowing a reflected light beam from the recording layer to pass through;
the signal generation layer including a transmittance changing region;
the transmittance changing region having a transmittance with respect to the incident light beam different from its neighborhood, thereby generating a repeated transmittance change according to rotation of the medium,
wherein the recording layer has a multilayer structure comprising a first dielectric sublayer, a phase-change recording sublayer, a second dielectric sublayer, and a transparent reflection sublayer;
and wherein the recording layer is formed on the first main surface of the substrate while the signal generation layer is formed on the second main surface of the substrate.

5. An optical information-recording medium comprising:
(a) a disk-shaped substrate having a first main surface and a second main surface opposite to the first main surface;
an incident surface of the medium being located nearer to the first main surface than the second main surface;
(b) a recording layer formed on the substrate; and
(c) a signal generation layer formed on the substrate in such a way as to be nearer to the incident surface than the recording layer;
the signal generation layer allowing an incident light beam irradiated to the incidence surface to pass through and allowing a reflected light beam from the recording layer to pass through;
the signal generation layer including a step formation region that forms a depression or protrusion with respect to its neighborhood;
the step formation region having a thickness different from its neighborhood, thereby generating a repeated change of focusing level of the incident light beam according to rotation of the medium,
wherein the recording layer has a multilayer structure comprising a lower protection sublayer, a magneto-optical recording sublayer, an upper protection sublayer, and a metal reflection sublayer;
the recording layer being formed on the first main surface of the substrate while the signal generation layer is formed on the second main surface of the substrate.

6. An optical information-recording medium comprising:
(a) a disk-shaped substrate having a first main surface and a second main surface opposite to the first main surface;
an incident surface of the medium being located nearer to the first main surface than the second main surface;
(b) a recording layer formed on the substrate; and
(c) a signal generation layer formed on the substrate in such a way as to be nearer to the incident surface than the recording layer;
the signal generation layer allowing an incident light beam irradiated to the incidence surface to pass through and allowing a reflected light beam from the recording layer to pass through;
the signal generation layer including a step formation region that forms a depression or protrusion with respect to its neighborhood;
the step formation region having a thickness different from its neighborhood, thereby generating a repeated change of focusing level of the incident light beam according to rotation of the medium,
wherein the recording layer has a multilayer structure comprising a first dielectric sublayer, a phase-change recording sublayer, a second dielectric sublayer, and a reflection sublayer;
the recording layer being formed on the first main surface of the substrate while the signal generation layer is formed on the second main surface of the substrate.

7. An optical information-recording medium comprising:
(a) a disk-shaped substrate having a first main surface and a second main surface opposite to the first main surface;
an incident surface of the medium being located nearer to the first main surface than the second main surface;
(b) a recording layer formed on the substrate; and
(c) a signal generation layer formed on the substrate in such a way as to be nearer to the incident surface than the recording layer;
the signal generation layer allowing an incident light beam irradiated to the incidence surface to pass through and allowing a reflected light beam from the recording layer to pass through;
the signal generation layer including a step formation region that forms a depression or protrusion with respect to its neighborhood;
the step formation region having a thickness different from its neighborhood, thereby generating a repeated change of focusing level of the incident light beam according to rotation of the medium,
wherein the recording layer has a multilayer structure comprising a first dielectric sublayer, a second dielectric sublayer, a phase-change recording sublayer, a third dielectric sublayer, and a reflection sublayer;
the recording layer being formed on the first main surface of the substrate while the signal generation layer is formed on the second main surface of the substrate.

8. An optical information-recording medium comprising:
(a) a disk-shaped substrate having a first main surface and a second main surface opposite to the first main surface;
an incident surface of the medium being located nearer to the first main surface than the second main surface;

(b) a recording layer formed on the substrate; and (c) a signal generation layer formed on the substrate in such a way as to be nearer to the incident surface than the recording layer;

the signal generation layer allowing an incident light beam irradiated to the incidence surface to pass through and allowing a reflected light beam from the recording layer to pass through;

the signal generation layer including a step formation region that forms a depression or protrusion with respect to its neighborhood;

the step formation region having a thickness different from its neighborhood, thereby generating a repeated change of focusing level of the incident light beam according to rotation of the medium, wherein the recording layer has a multilayer structure comprising a first dielectric sublayer, a phase-change recording sublayer, a second dielectric sublayer, and a transparent reflection sublayer;

the recording layer being formed on the first main surface of the substrate while the signal generation layer is formed on the second main surface of the substrate.

* * * * *